(12) United States Patent
Quilter, Jr.

(10) Patent No.: US 8,881,105 B2
(45) Date of Patent: Nov. 4, 2014

(54) TEST CASE MANAGER

(76) Inventor: Patrick J. Quilter, Jr., Silver Spring, MD (US)

(*) Notice: Subject to any disclaimer, the term of this patent is extended or adjusted under 35 U.S.C. 154(b) by 1563 days.

(21) Appl. No.: 12/082,592

(22) Filed: Apr. 11, 2008

(65) Prior Publication Data

US 2008/0270841 A1  Oct. 30, 2008

Related U.S. Application Data

(60) Provisional application No. 60/922,797, filed on Apr. 11, 2007.

(51) Int. Cl.
*G06F 9/44* (2006.01)
*G06F 11/36* (2006.01)
*G06F 9/455* (2006.01)

(52) U.S. Cl.
CPC ........ *G06F 11/3672* (2013.01); *G06F 11/3696* (2013.01); *G06F 11/3684* (2013.01); *G06F 9/44* (2013.01); *G06F 9/45512* (2013.01)
USPC .............................. 717/124; 717/115; 714/38

(58) Field of Classification Search
CPC ............ G06F 11/3684; G06F 11/3672; G06F 11/3696; G06F 9/44; G06F 9/45512
USPC ...................... 717/124, 115; 714/38, E11.001
See application file for complete search history.

(56) References Cited

U.S. PATENT DOCUMENTS

| | | | | |
|---|---|---|---|---|
| 5,067,129 A * | 11/1991 | Evans et al. | ...................... | 714/32 |
| 5,600,789 A * | 2/1997 | Parker et al. | ................ | 714/38.11 |
| 6,002,869 A * | 12/1999 | Hinckley | ........................ | 717/124 |
| 7,039,899 B1 * | 5/2006 | Quiroga | .......................... | 717/115 |
| 7,313,564 B2 * | 12/2007 | Melamed et al. | ............. | 717/124 |
| 7,934,127 B2 * | 4/2011 | Kelso | ............................ | 714/38.1 |
| 7,958,495 B2 * | 6/2011 | Kelso | ............................ | 717/124 |
| 2003/0203342 A1 * | 10/2003 | Bowers | ......................... | 434/118 |
| 2008/0127101 A1 * | 5/2008 | Anafi et al. | .................... | 717/125 |

* cited by examiner

*Primary Examiner* — Jonathan C Teixeira Moffat
*Assistant Examiner* — Lynda Dinh
(74) *Attorney, Agent, or Firm* — Whiteford, Taylor & Preston, LLP; Peter J. Davis

(57) ABSTRACT

The test case manager interfaces with an application under test via an automation tool manager and is automation tool independent. Scripts are installed from a library based on the automation tool and the application type. The scripts perform the actions of learning the application objects, play back/validation, and automate test case creation. In a preferred embodiment, the test case manager drives the actions of the scripts. Scripts can be modified by customizing application specific actions and invoking them through the test case manager format.

9 Claims, 33 Drawing Sheets

| ApplPage | ObjectName | Value | ObjectAction |
|---|---|---|---|
| Motorcycle Insurance | TB_ZIP | 35618 | EnterData |
| Motorcycle Insurance | IM_Start.gif | NA | EnterData |
| General Information | TB_FirstName | Bobbie-Jo | EnterData |
| General Information | TB_LastName | Smith | EnterData |
| General Information | DD_AddressType | Street | EnterData |
| General Information | TB_Street address | 458 Green Tree Dr | EnterData |

| Play Back AppPage | Play Back ObjectName | Data Capture Sequence ||||
|---|---|---|---|---|---|
| | | Capture From AppPage | Capture From ObjectName | Value | ObjectAction |
| Motorcycle Insurance | TB_Email | Motorcycle Insurance | TB_Email | Testcase1@yahoo.com | Input |
| Motorcycle Insurance | TB_Password | Motorcycle Insurance | TB_Password | Password1 | Input |
| Motorcycle Insurance | BN_Recall | Motorcycle Insurance | BN_Recall | NA | EnterData |
| Motorcycle Insurance | TB_Zip | Motorcycle Insurance | TB_Zip | NA | z_Scrape |
| Motorcycle Insurance | IM_Start.gif | Motorcycle Insurance | IM_Start.gif | NA**EnterData | z_Insert |
| General Information | TB_FirstName | General Information | TB_FirstName | NA | z_Scrape |
| General Information | TB_LastName | General Information | TB_LastName | NA | z_Scrape |
| General Information | DD_AddressType | General Information | DD_AddressType | NA | z_Scrape |
| General Information | TB_Street Address | General Information | TB_Street Address | NA | z_Scrape |

Figure 30

| AppPage | ObjectName | Value | ObjectAction |
|---|---|---|---|
| Motorcycle Insurance | TB_ZIP | 35618 | EnterData |
| Motorcycle Insurance | IM_Start.gif | NA | EnterData |
| General Information | TB_FirstName | Bobbie-Jo | EnterData |
| General Information | TB_LastName | Smith | EnterData |
| General Information | DD_AddressType | Street | EnterData |
| General Information | TB_Street address | 458 Green Tree Dr | EnterData |

Figure 31

...or get more specific.

by Make
[Show me all ▼]

| AppPage | ObjectName | Value | ObjectAction |
|---|---|---|---|
| Vehicle Search | DD_by Make | Show me all | Compare |

Figure 32

...or get more specific.

by Make

[Audi ▼]  [Search]

| ApplPage | ObjectName | Value | ObjectAction |
|---|---|---|---|
| Vehicle Search | DD_by_Make | Audi | EnterData |
| Vehicle Search | BN_Search | NA | EnterData |

Figure 33

...or get more specific.

by Make

[Show me all ▼]  [Search]

| ApplPage | ObjectName | Value | ObjectAction |
|---|---|---|---|
| Vehicle Search | BN_Search | True | Exist |

Figure 34

| AppPage | ObjectName | Value | ObjectAction |
|---|---|---|---|
| Vehicle Search | BN_Search | True | IsEnabled |

| AppPage | ObjectName | Value | ObjectAction |
|---|---|---|---|
| <Any Page> | <Any Object> | http://yahoo.com | NavigateURL |

| AppPage | ObjectName | Value | ObjectAction |
|---|---|---|---|
| <Any Page> | <Any Object> | 30 | QTPWait |

| AppPage | ObjectName | Value | ObjectAction |
|---|---|---|---|
| Logon | User name | _Test1 | RandomValue |

...or get more specific.

by Make

| AppPage | ObjectName | Value | ObjectAction |
|---|---|---|---|
| Vehicle Search | DD_by_Make | SaveTheMakeValue | StoreValue |

[Search]

| AppPage | ObjectName | Value | ObjectAction |
|---|---|---|---|
| Vehicle Search | DD_Search | 15 | SyncObject |

Figure 40

| AppPage | ObjectName | Value | ObjectAction |
|---|---|---|---|
| <Any Page> | <Any Object> | SaveTheMakeValue | UseStoredValue |

Figure 41

| AppPage | ObjectName | Value | ObjectAction |
|---|---|---|---|
| <Any Page> | <A WebTable> | <Name of Clickable Obj> | WebTableClick |

Figure 42

| AppPage | ObjectName | Value | ObjectAction |
|---|---|---|---|
| Vehicle Search | BN_Search | True | Width |

Figure 43

| Play Back AppPage | Play Back ObjectName | Capture From AppPage | Capture From ObjectName | Value | ObjectAction |
|---|---|---|---|---|---|
| <Page 1> | <Object 1> | <Page 1> | <Object 1> | 1234***Enter Data | z_InsertIntoDatatable |

| AppPage | ObjectName | Value | ObjectAction |
|---|---|---|---|
| <Page 1> | <Object 1> | 1234 | Enter Data |

Figure 44

TEST CASE MANAGER

CROSS-REFERENCE TO RELATED APPLICATION

This application is based upon and claims benefit of co-owned U.S. Provisional Patent Application Ser. No. 60/922,797, filed with the U.S. Patent and Trademark Office on Apr. 11, 2007 by the inventor herein entitled "Test Case Manager," the specification of which is incorporated herein by reference in its entirety.

BACKGROUND OF THE INVENTION

1. Field of the Invention

The invention comprises a system to enable more efficient automated testing of websites and graphic user interfaces.

2. Background

Typically, in order to test software design, a test routine is developed to evaluate all the features of the software. The routine usually records specific keystrokes and creates a script that can be automatically followed. A tester must validate the script and save it to be re-executed multiple times to verify the software. Unfortunately, this type of script is not responsive to changes in the software. Accordingly, if the software is changed, the tester must start from the beginning and the test routine must be modified or redeveloped from scratch.

There remains a need, therefore, for an automatic test manager that can evaluate an application, capture data, and create test routines. According to a first aspect of the invention, a script driver captures data from an application to establish unique test cases. According to another aspect of the invention, the script driver processes instructions to generate, execute, and record results of test cases.

SUMMARY OF THE INVENTION

It is, therefore, an object of the present invention to provide a test case manager that avoids the disadvantages of the prior art.

Accordingly, the present invention provides a software system including user interfaces to access control panels in order to capture data and generate test scenarios.

It is an object of the present invention to make automated testing more cost effective. It is a related object of the present invention to help overcome delays to application deliverables. It is a further object of the present invention to utilize and maximize a customer's initial automation investment.

It is another object of the present invention to provide audible proof of thorough testing. It is a further object of the present invention to remove the burden of heavy test case maintenance.

The test case manager (TCM) according to the present invention is automation tool independent. Scripts may be installed from a library based on the automation tool and the application type. The scripts perform the actions of learning the application objects, play back/validation, and automate test case creation. In a preferred embodiment, the test case manager interfaces with the application under test via an automation tool and drives the actions of the scripts. Scripts can be modified by customizing application specific actions and invoking them through the test case manager format.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 26 shows an exemplary instruction set for describing an embodiment of the present invention;

FIGS. 28 and 29 show another page of an exemplary application under test, with data input, according to an embodiment of the present invention;

FIG. 30 shows an exemplary data capture set for describing an embodiment of the present invention;

FIG. 31 shows exemplary test results for describing an embodiment of the present invention;

FIGS. 32-43 shows exemplary instruction lines for describing an embodiment of the present invention; and FIGS. 44 and 45 show examples of insertion of data into a database for describing an embodiment of the present invention

DESCRIPTION OF EXEMPLARY EMBODIMENTS

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Generally, software application development requires many levels of communication:

Subject matter experts (non-technical) define an application on paper (requirements)

Code developers turn the paper requirement aspects into software

Testers derive test cases from the paper aspects to test the software

Subject matter experts rely on the developers and testers to interpret the paper requirements correctly, which involves a communication risk. The Test Case Manager described herein bridges the communication between the subject matter experts and the testers to create an automated test. The Test Case Manager of the present invention allows subject matter experts to convey their knowledge without needing coding skills. Without the automated testing enabled by the present invention, a business would require code developing skills for personnel resources, which can be expensive for organizations.

Figure 1:
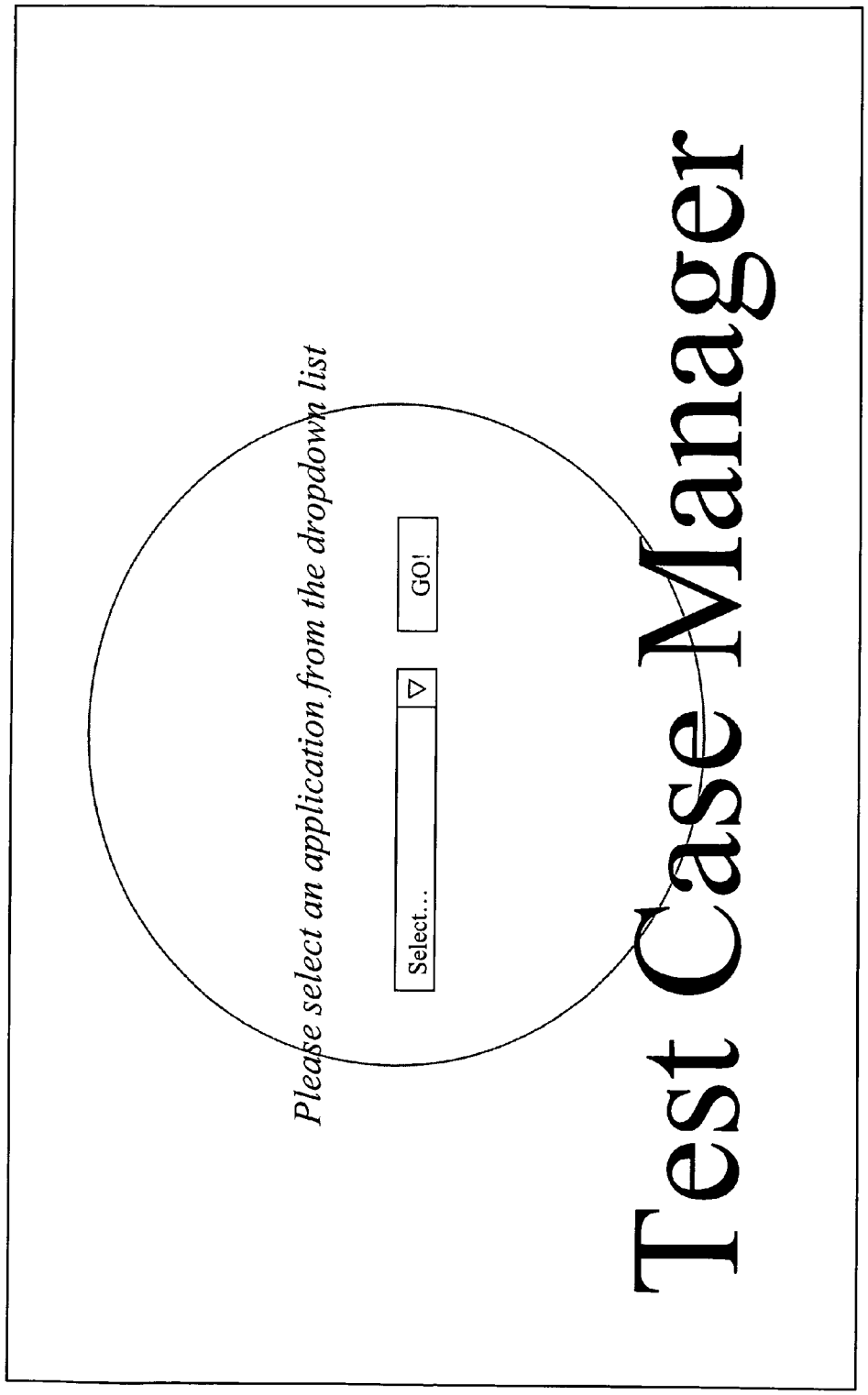
FIG. 1 shows a graphic user interface for application selection according to a first embodiment of the present invention.
Figure 2:
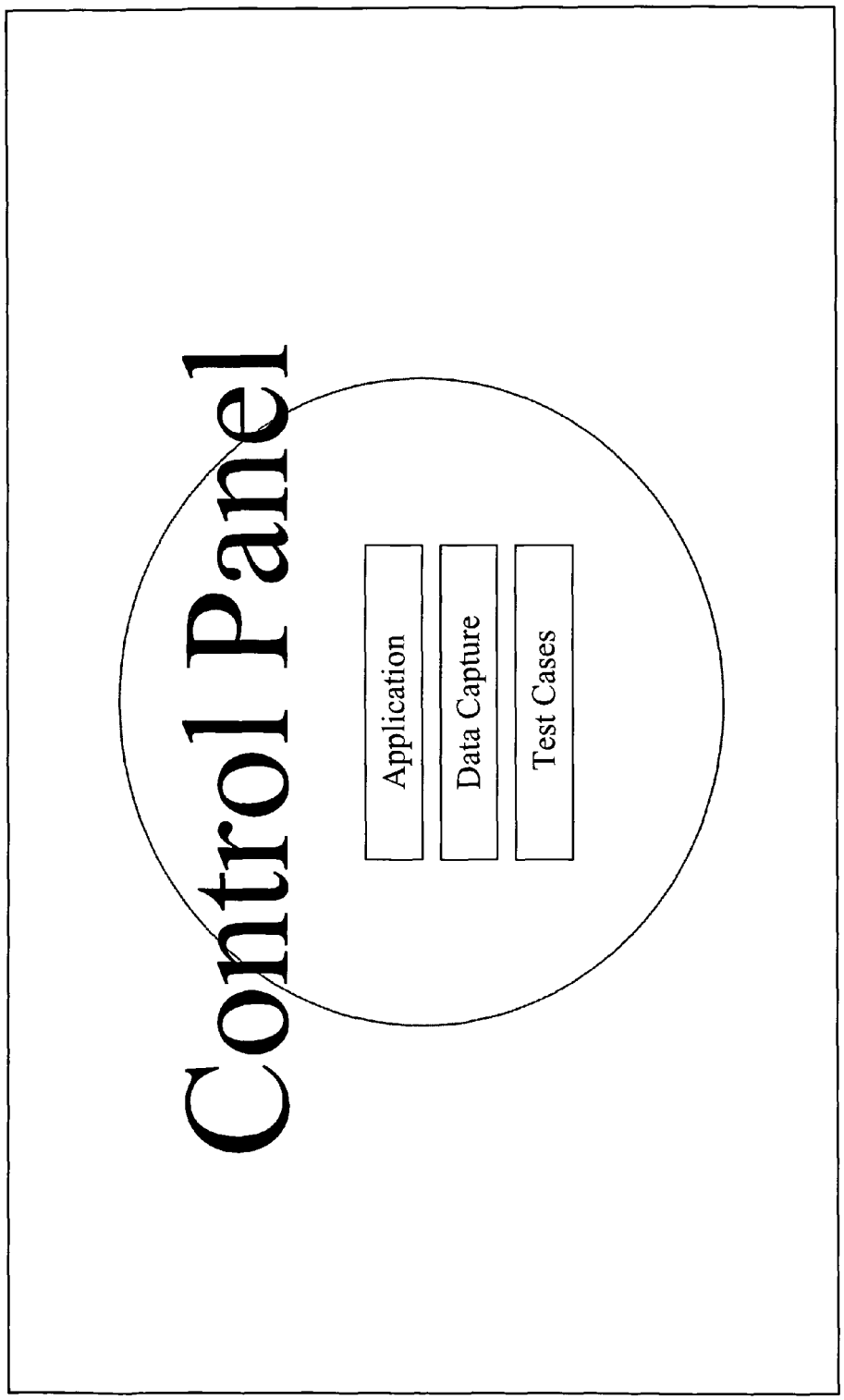
FIG. 2 shows a graphic user interface for access to the control panels according to a first embodiment of the present invention.

Referring to the drawings, FIG. 1 shows a home page to allow a user to select an application according to a first embodiment of the present invention. As shown in FIG. 2, the invention comprises a series of modules: the Application module learns and stores application test objects; the Data Capture module creates test case data variations; and the Test Cases module stores and maintains test case information.

In a first embodiment, the Application module builds the first component of a relational database by populating the object table. The Test Case and Data Capture modules will reference these objects. The Data Capture module organizes step-by-step instructions to create test cases programmatically. The user creates instructions that specify a path to capture data previously entered into an application under test (AUT) and relates the captured values to objects in the object table. This process automates the relations that occur when using the Test Case module, and can be used to spawn several test case variations. The Test Case module creates test cases in the form of step-by-step instructions and relates user defined values to objects in the object table. The values are stored in a separate data table. Test cases may be delineated by unique test case names. The test case names are stored in a separate table and related to the data table.

Figure 3:
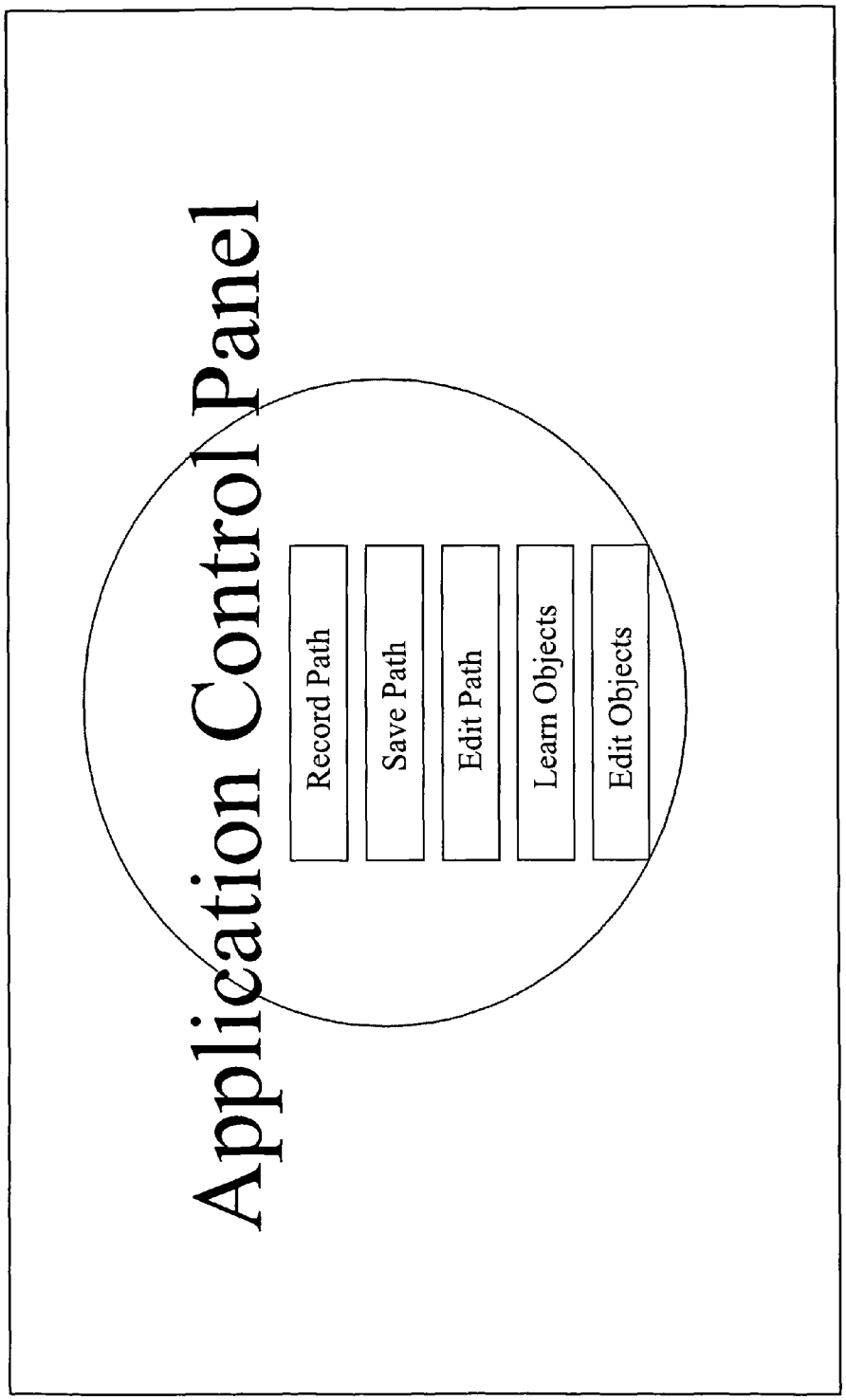
FIG. 3 shows a graphic user interface for access to the Application Control Panel according to a first embodiment of the present invention.

FIG. 3 shows a graphic user interface for access to the Application Control Panel, which enables several functions. The Record Path function uses the automation tool's recording capabilities to record on a series of application screens. The Save Path function stores the recorded information in a database. The Edit Path function permits any changes necessary to the stored, recorded path. The Learn Objects function traverses the recorded path while learning all objects on each page in the path. The Edit Objects function maintains all object information for the application under test.

Figure 4:
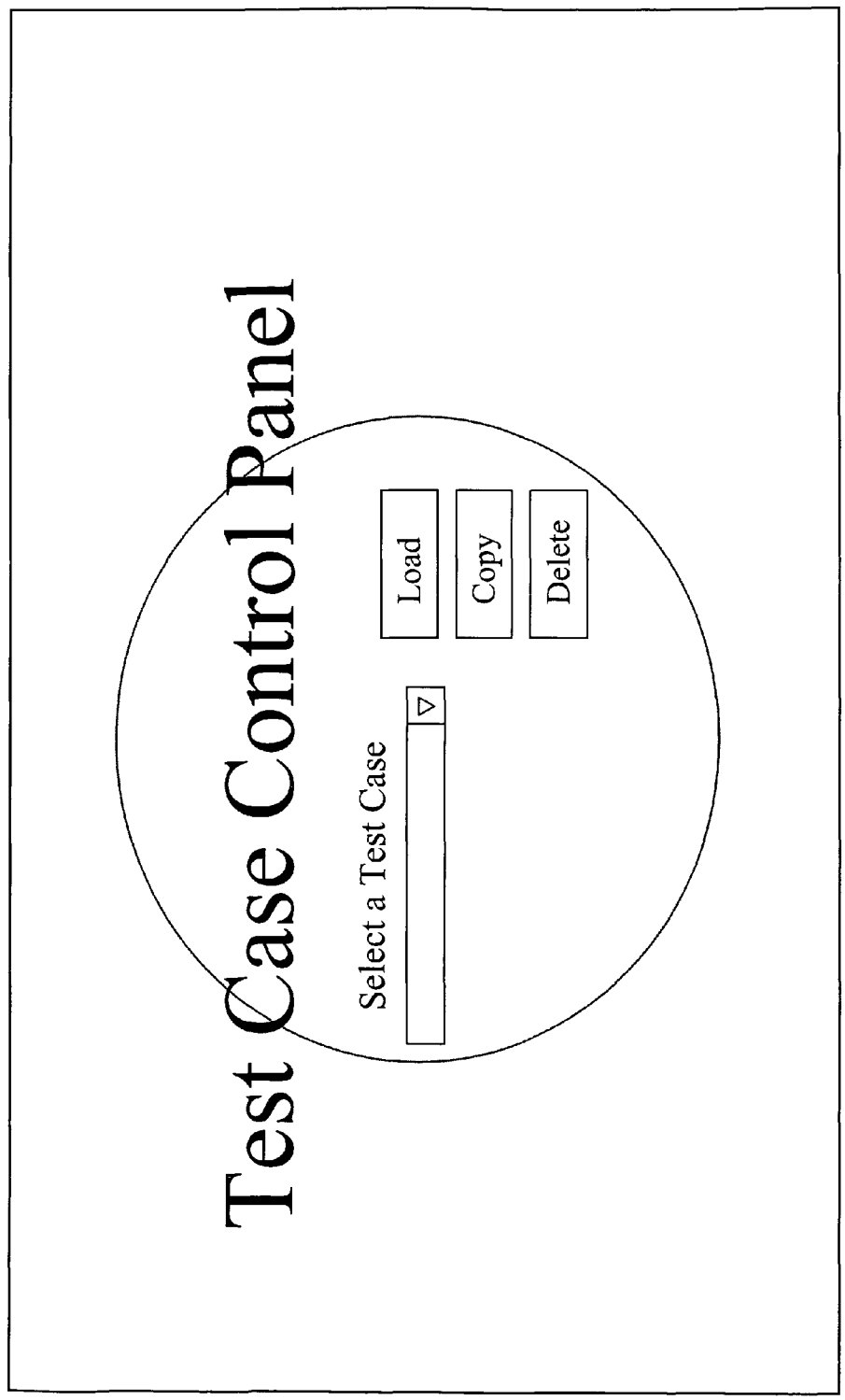
FIG. 4 shows a graphic user interface for access to the Test Case Control Panel according to a first embodiment of the present invention.

The Test Case Control Panel is shown in FIG. 4. The Test Case Control Panel enables several functions. The Load Test Case function loads test case information into a data table based on the selected test case name in the selection drop down list. The Copy Test Case function creates a new test case by copying information from an existing test case in the selection drop down list. The Delete function removes a test case from the selection drop down list. The Data Table function allows organization of test case information by assigning values and action words to application objects. The Playback Script Mode function processes each individual data table entry and carries out the specified actions on the application objects.

Figure 5:
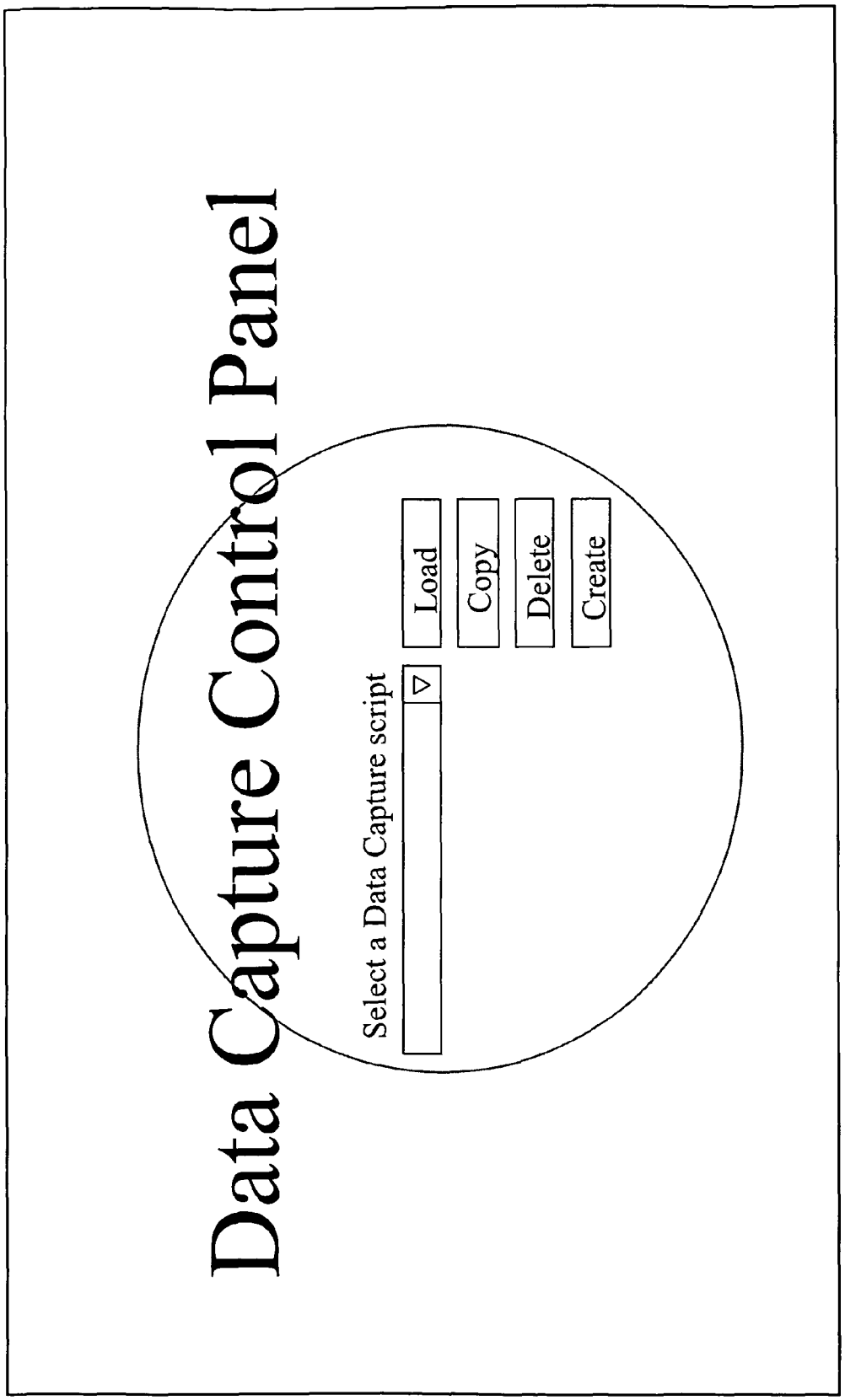
FIG. 5 shows a graphic user interface for access to the Data Capture Control Panel according to a first embodiment of the present invention.
Figure 6:
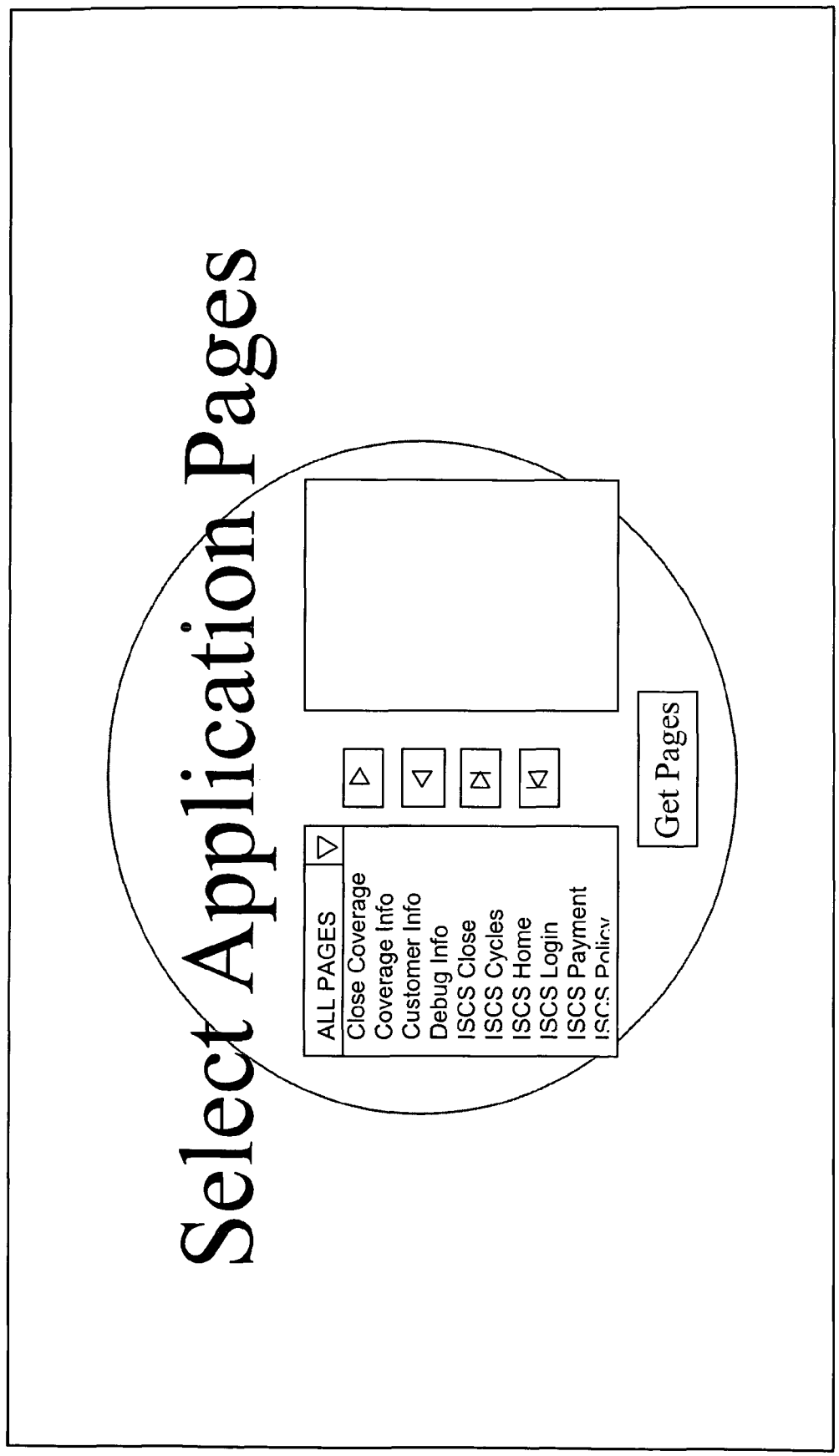
FIG. 6 shows a graphic user interface for selection of application pages according to a first embodiment of the present invention.

The Data Capture Control Panel is shown in FIG. 5. The Data Capture Control Panel enables several functions. The Load function loads an existing data capture script into a data table. The Copy function creates a new data capture script by copying information from an existing data capture script in the selection drop down list. The Delete function removes a data capture script from the selection drop down list. The Create function allows for existing data in the application under test to be mapped to test case manager objects for fast and accurate test case creation. The Data Capture Script Mode function navigates a specified path, captures specified application data, and builds a new test case data table with the collected information. As shown in FIG. 6, the invention enables a user to select specific pages in an application for the data capture function.

Figure 7A:
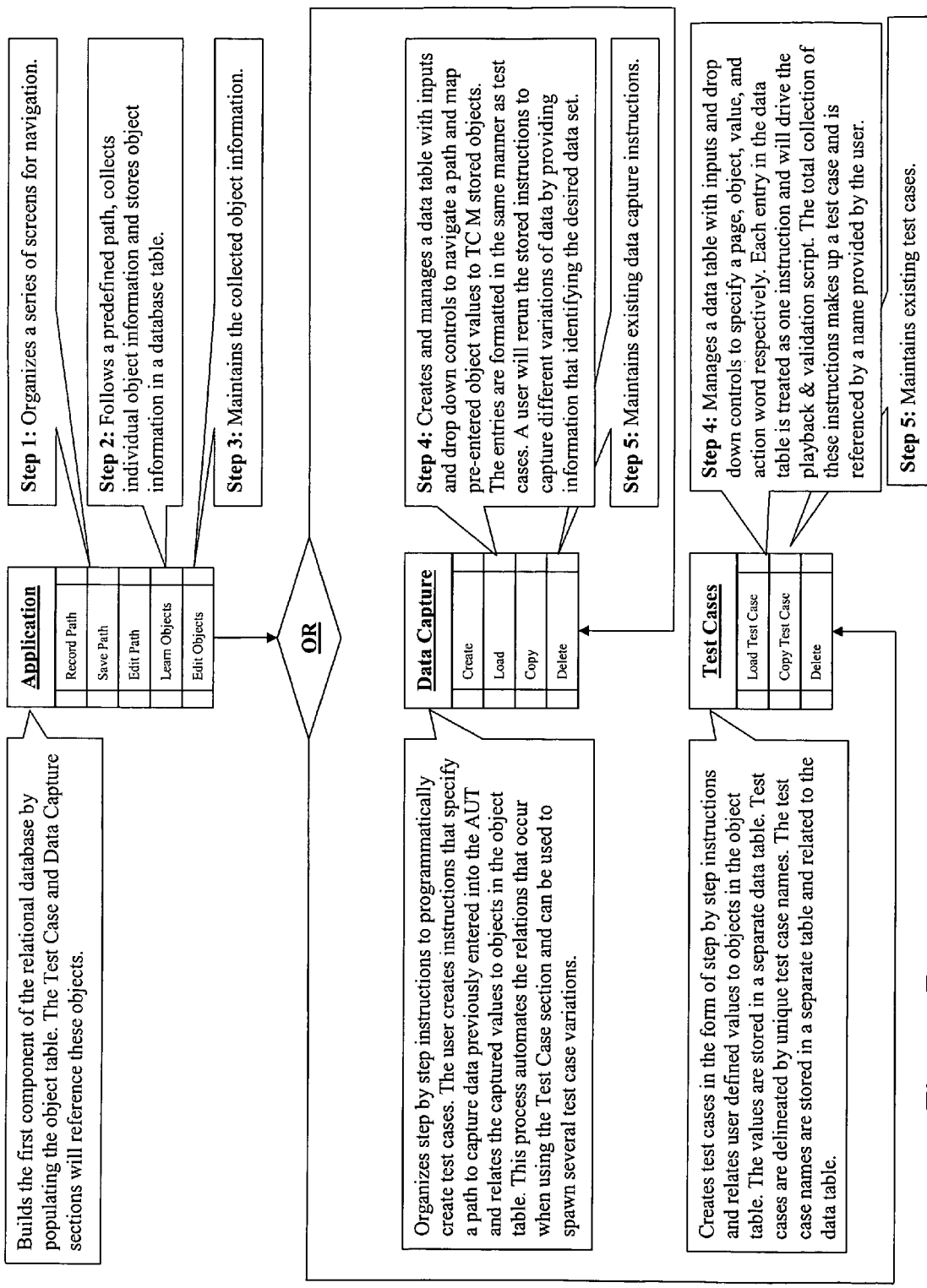
FIGS. 7a and 7b show a flow chart of the system according to a first embodiment of the present invention.

Referring to FIG. 7*a*, the basic steps for using the Test Case Manager (TCM) system described herein are illustrated. The Application module builds the first components of the relational database by populating the object table. The Test Case module and Data Capture module will reference the objects. The system is initiated by the Application module, which organizes a series of screens for navigation through the system. The first task is to establish a predefined path so that the system can follow the path, collect individual object information, and store the object information in a database table. The system includes a relational database that maintains the collected object information.

The Data Capture module organizes systematic instructions to programmatically create test cases. The user creates instructions that specify a path to capture data previously entered into the AUT and relates the captured values to objects in the object table. This process automates the relations that occur when using the Test Case section and can be used to spawn several test case variations. The Data Capture module creates and manages a data table with inputs and drop down controls to navigate a path and map pre-entered object values to the TCM stored objects. The entries are formatted in the same manner as test cases. A user will rerun the stored instructions to capture different variations of data by providing information that identify the desired data set. The Data Capture module also maintains existing data capture instructions.

The Test Case module creates test cases in the form of systematic instructions, and relates user defined values to objects in the object table. The values may be stored in a separate data table. Test cases are delineated by unique test case names. The test case names may be stored in a separate table and related to the data table. The Test Case module manages a data table with inputs and drop down controls to specify a page, object, value, and action word respectively. Each entry in the data table is treated as one instruction and will drive the playback and validation script. The total collection of these instructions makes up a test case and is referenced by a name provided by the user. The Test Case module also maintains existing test cases.

Figure 7B:
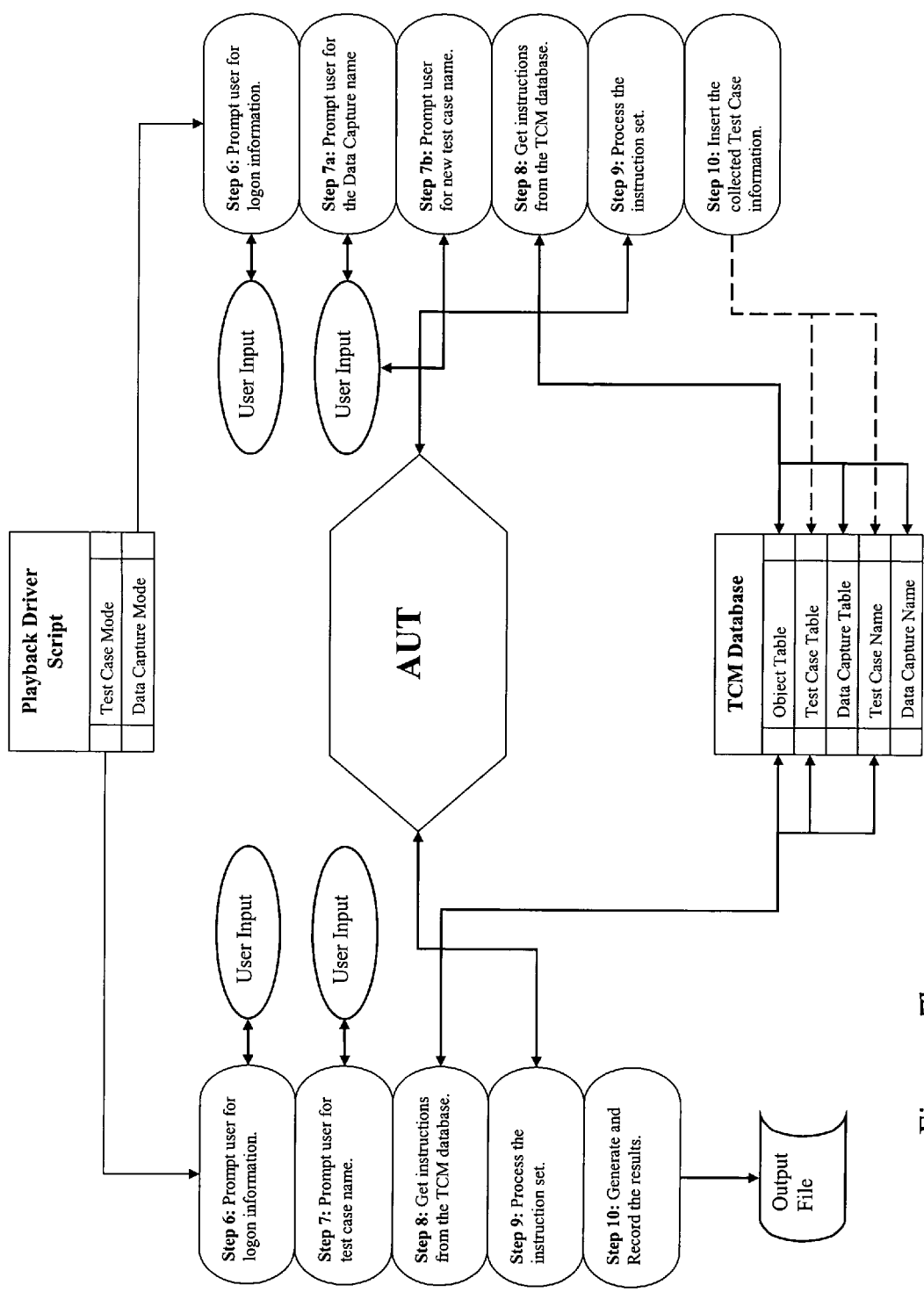

FIG. 7b illustrates the steps that a user can follow to play back a script from either the Test Case mode or the Data Capture mode. In the Test Case mode, the user is prompted for logon information. The user provides input. Then, the user is prompted for a test case name. Again, the user provides input. Following input of the test case name, the system gets instructions from the TCM database for the particular test case. Based on the selected test case, the system will process the instruction set against the AUT, and generate and record the results. The results may then be stored in an output file.

In the Data Capture mode, the user is prompted for logon information. The user provides input. The user is then prompted for a data capture name. The user provides input. Then, the user is prompted for a new test case name. Again, the user provides input. Following input of the new test case name, the system gets instructions from the TCM database for the data capture name. Based on the selected data capture case, the system will process the instruction set against the AUT. The collected test case information may then be stored in the TCM database.

Figure 8:
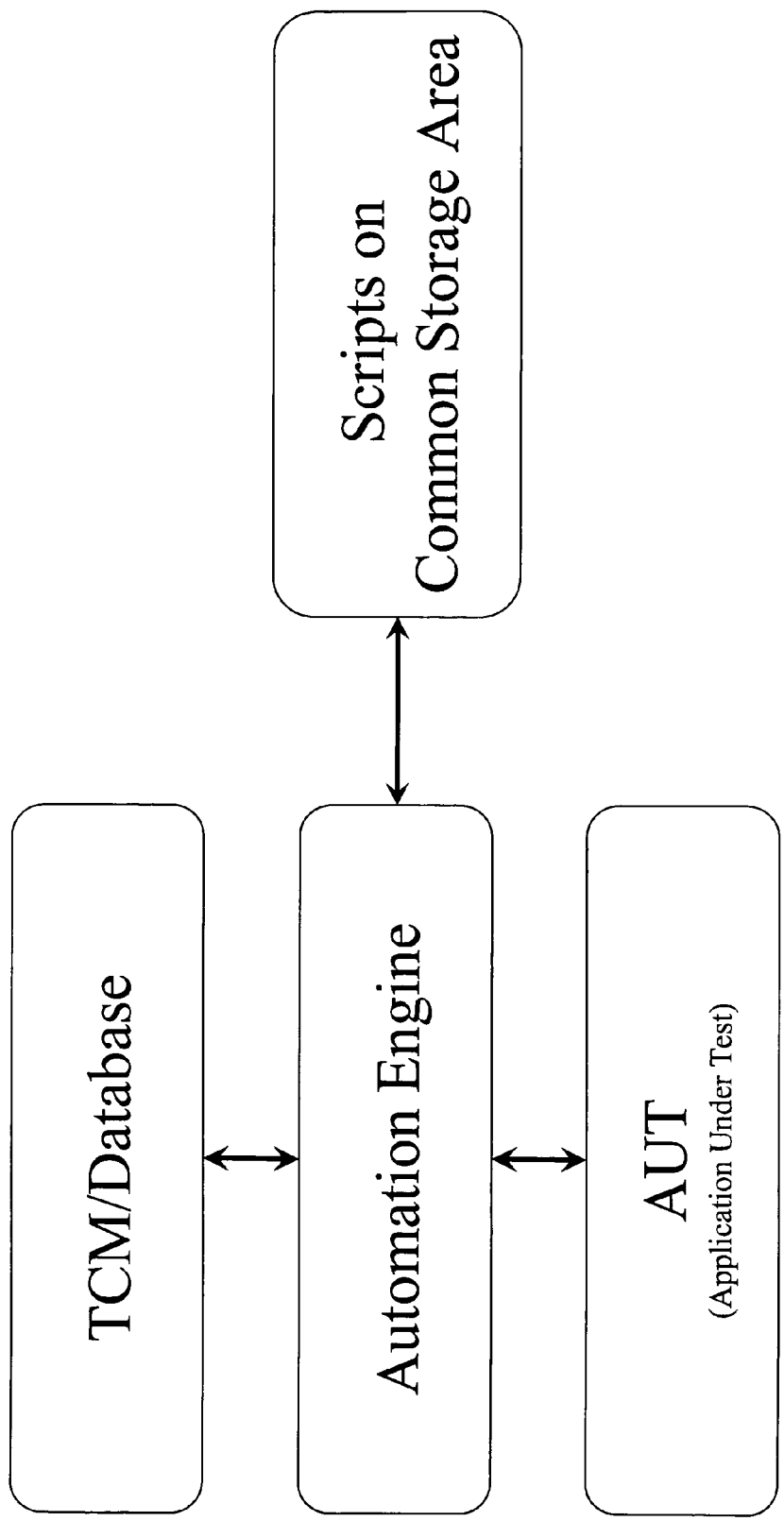
FIG. 8 shows a basic configuration of a test case manager system according to a first embodiment of the present invention.

As shown in FIG. 8, the TCM database may be an SQL, Oracle, or Access database. The automation tool has the ability to record and playback scripts. The system includes a common storage area for scripts (i.e. server) and an available network drive and ODBC driver. In a preferred embodiment, the application should have a means to retrieve previously entered data for data capture mode.

A step-by-step instruction for installing and using an embodiment of the invention is described below. The example is specific to one type of automated engine (HP QTP), but the invention is not limited to that type of engine.

Figure 9:
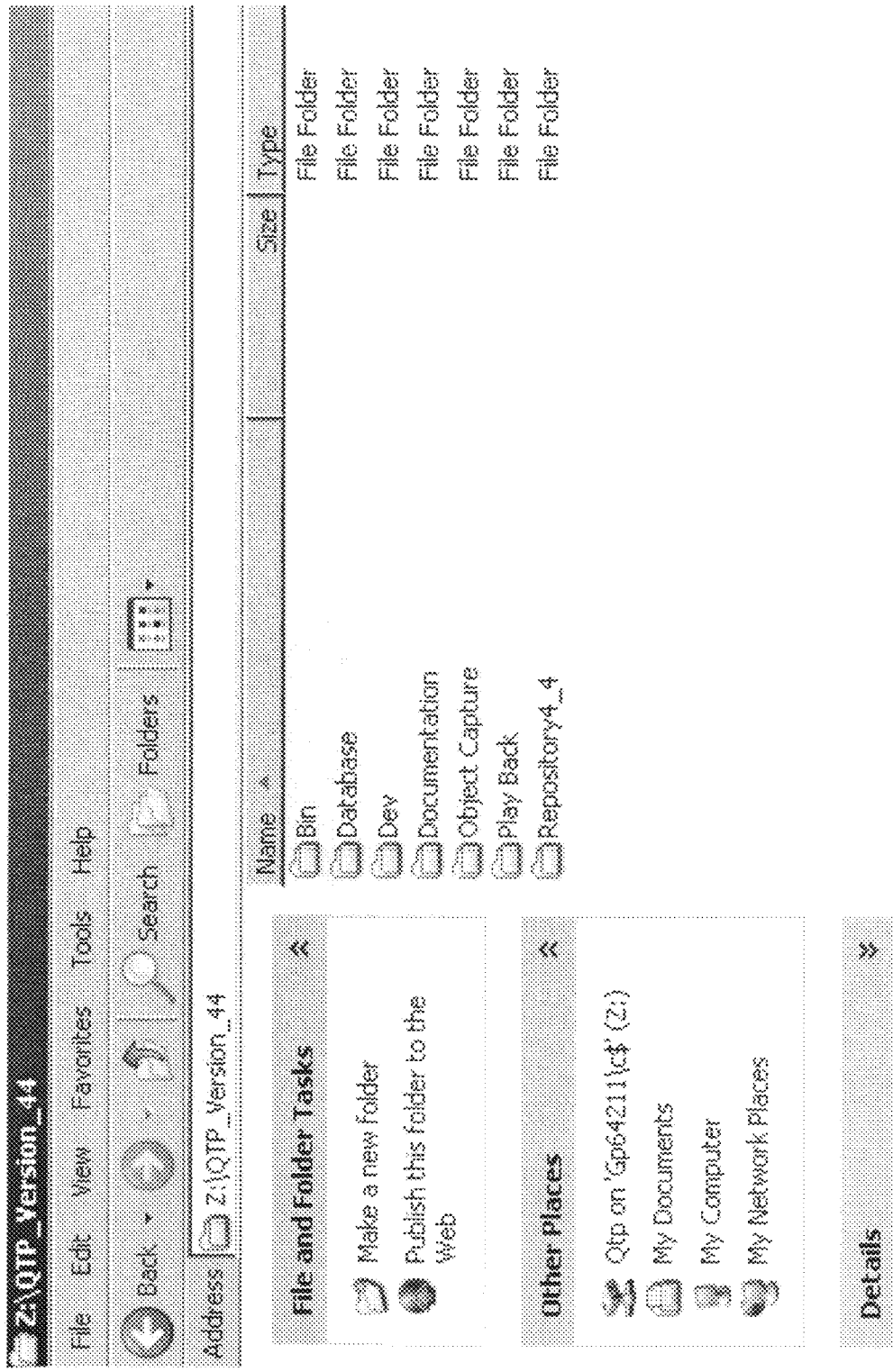
FIG. 9 shows a network directory for installation of an embodiment of the present invention.
Figure 10:
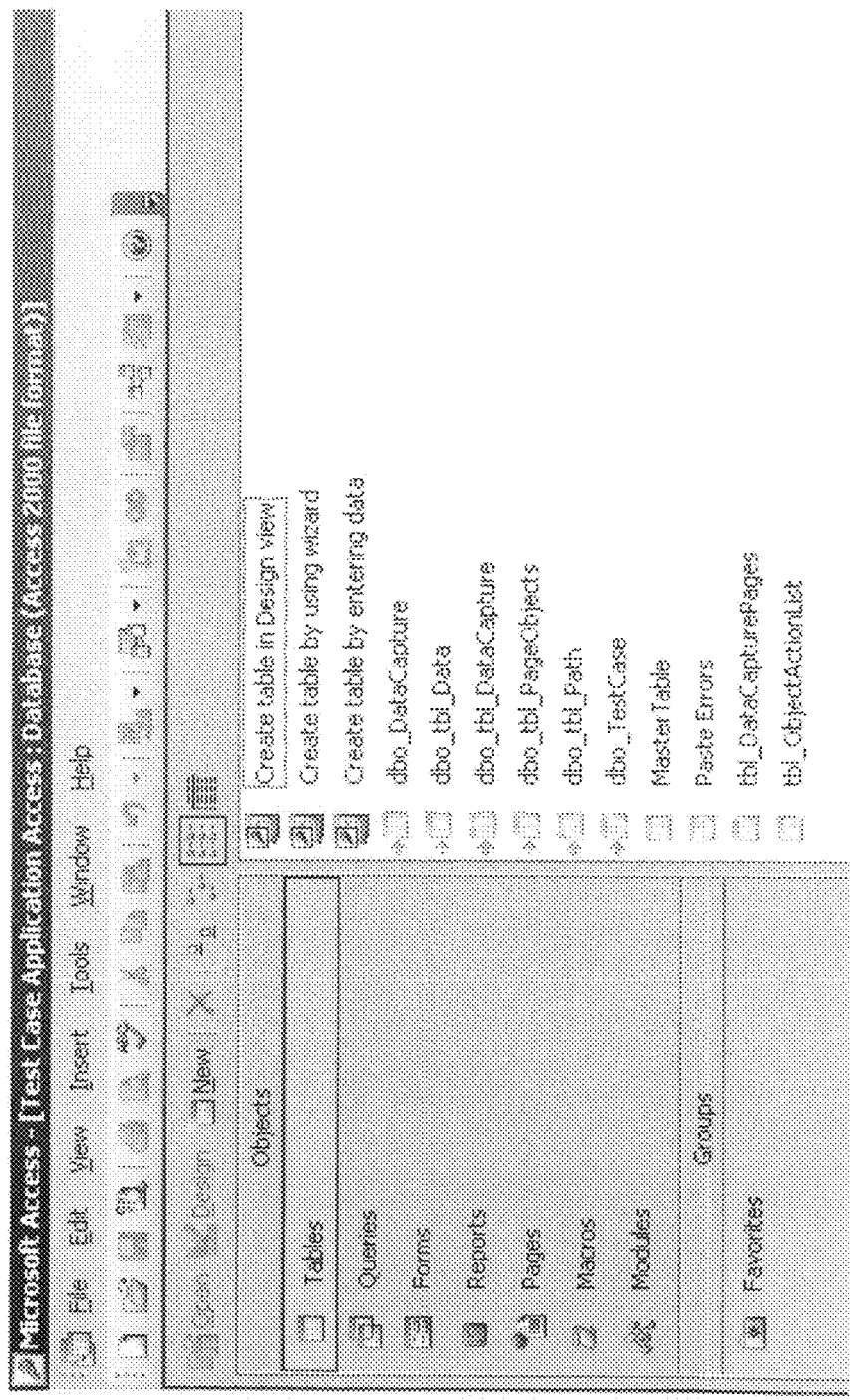
FIG. 10 shows a database configuration of an embodiment of the present invention.

1. INSTALLATION 1.1 TCM Library
  A. Create a shared directory
  B. Map the 'Z:' network drive to the shared directory
  C. Copy the TCM library folder 'QTP_Version_44' into the shared directory
  D. Double click the QTP_Version_44 directory. The file structure is shown in FIG. 9.
1.2 Database Configurations
  A. Double click the 'Database' folder
  B. Open 'Test Case Application Access.mdb'
  C. Close the TCM welcome screen (click the inner 'X')
  D. On the left panel, select the 'table' view
  E. From the top toolbar, select: File; Get External Data; Link Tables
  F. Navigate to 'Z:\QTP_Version_44\Database' and select 'DATA.mdb'
  G. Select all of the tables and then hit the OK button
  H. Rename the tables with blue arrows by adding 'dbo_' in front of each name, as shown in FIG. 10.
  I. Close the database
  J. Right click on the 'Test Case Application Access.mdb' and select: Send To; Desktop (Create Shortcut).
  K. You can rename the Shortcut on your desktop to match the AUT name.
  L. Double click the shortcut and Turn off warning messages for the database
    1) TOOLS
    2) OPTIONS
    3) Remove CONFIRM Check boxes
1.3 Script Configuration
  A. Create an ODBC connection DSN
    1) START
    2) SETTINGS
    3) CONTROL PANEL
    4) ADMIN TOLLS
    5) DATA SOURCES (ODBC)
    6) SELECT SYSTEM DSN TAB
    7) ADD
    8) MICROSOFT ACCESS DRIVER.mdb
    9) FINISH
    10) DATA SOURCE NAME (type and record a DSN name)
    11) SELECT
    12) DRIVES: SELECT 'Z:\QTP_Version_44\Database\DATA.mdb'
    13) OK
  B. Edit the DSN name in the QTP VBS configuration File
    1) Navigate to 'Z:\QTP_Version_44\Bin'
    2) Right Click on file 'CommonFunctions.vbs'
    3) Edit
    4) Search the file for "ConnectionString="
    5) Set "ConnectionString="DSN=ODBC <the name you recorded>"
    6) File/Save
1.4 Configuring Addition Machines
  A. Map the 'Z:' network drive to the shared directory
  B. Create an ODBC connection DSN
    1) START
    2) SETTINGS
    3) CONTROL PANEL
    4) ADMIN TOLLS
    5) DATA SOURCES (ODBC)
    6) SELECT SYSTEM DSN TAB
    7) ADD
    8) MICROSOFT ACCESS DRIVER.mdb
    9) FINISH
    10) DATA SOURCE NAME (the recorded DSN name)
    11) SELECT
    12) DRIVES: SELECT 'Z:\QTP_Version_44\Database\DATA.mdb'
    13) OK

Figure 11:
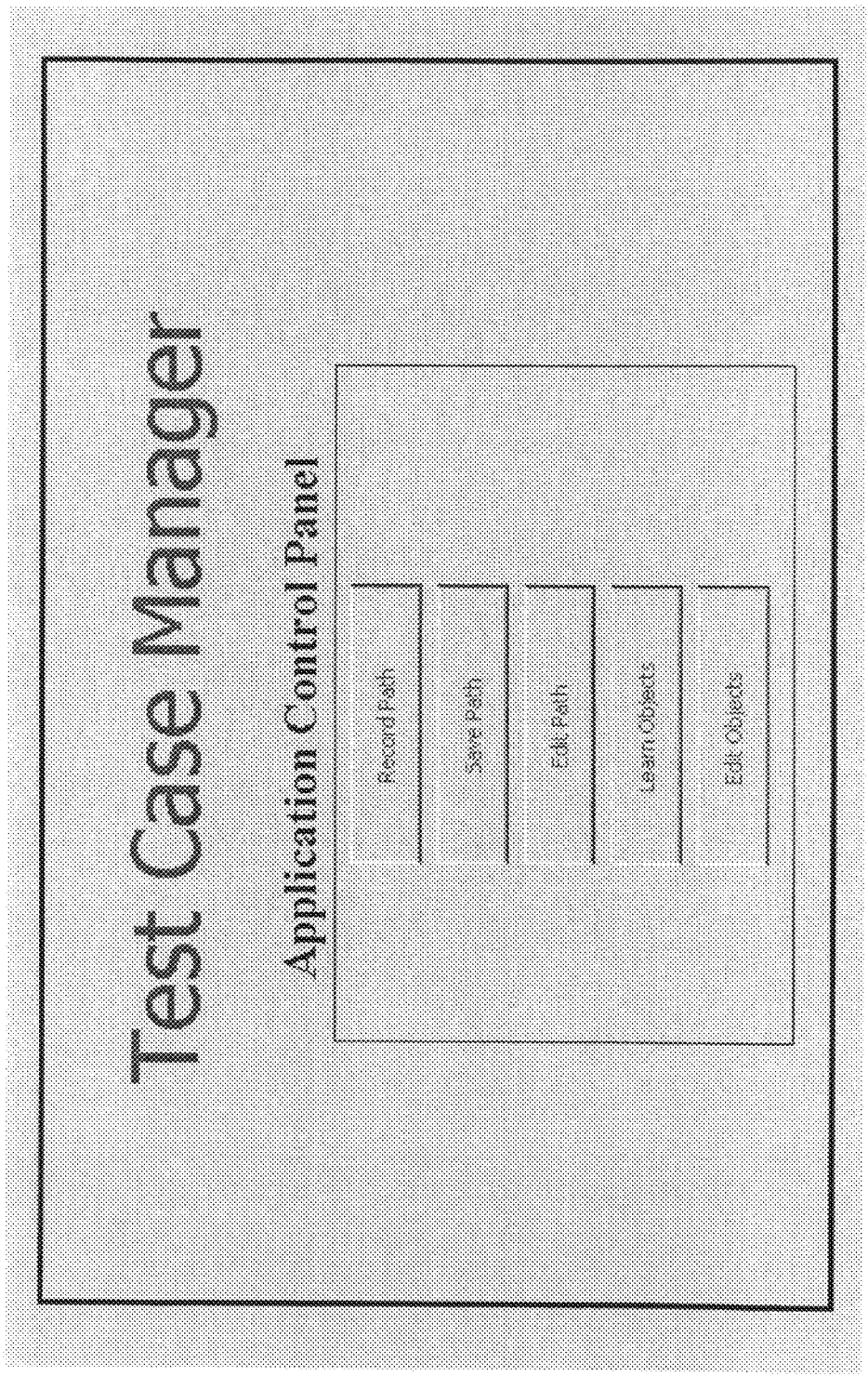
FIG. 11 shows a graphic user interface for access to the application control panels according to an embodiment of the present invention.

2. CONTROL PANELS 2.1 Application
FIG. 11 shows a control panel that uses a series of steps to learn and store application test objects.
2.1.1 Record Path
The Record Path step uses the automation tool's recording capabilities to record actions on an application in the form of a script.
  A. Click the 'Record Path' button
  B. Type the URL or execution path of the application into the dialog box
  C. QTP will launch in record mode and opens the application
  D. Once QTP minimizes you can begin creating a data path

2.1.2 Save Path

The Save Path step stores the recorded script into the TCM database as a path.
- A. Click the 'Save Path' button
- B. The QTP recorded script will be saved into a database table

2.1.3 Edit Path

The Edit Path step allows for any necessary changes to the stored, recorded path.
- A. Click the 'Edit Path' button
- B. The user is presented with a table view of the script
- C. The user can edit any of the information so that the path can be recreated
- D. Close the table by hitting the inner 'x'

2.1.4 Learn Objects

Figure 12:
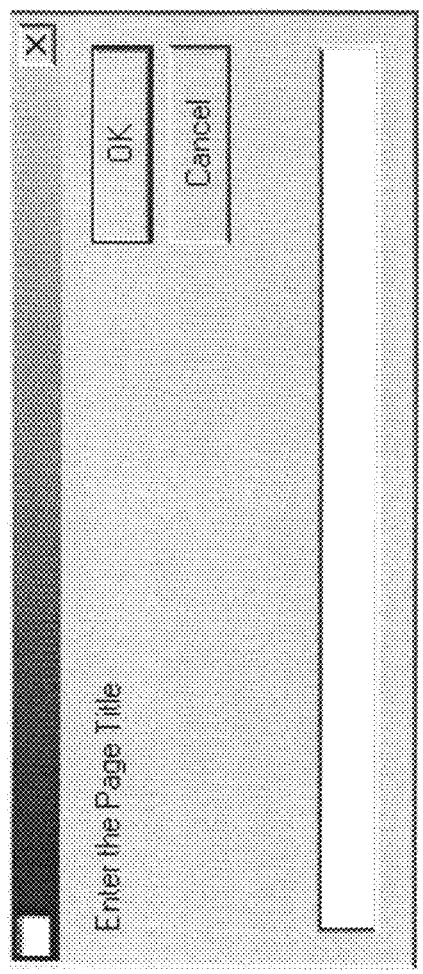
FIG. 12 shows a user input box according to an embodiment of the present invention.
Figure 13:
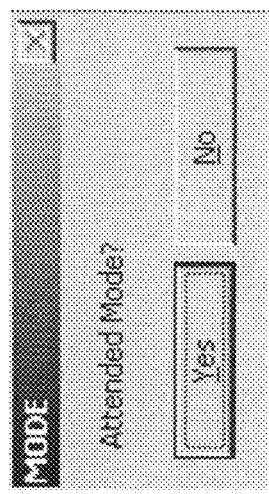
FIG. 13 shows an example of a user interface according to an embodiment of the present invention.
Figure 14:
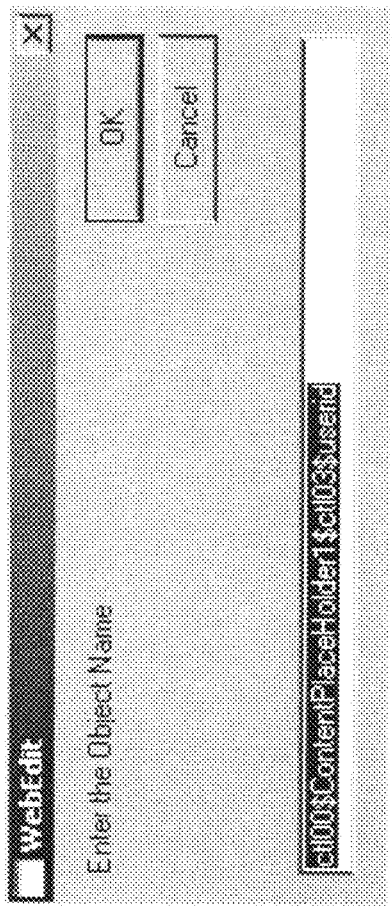
FIGS. 14 and 15 show a user input box with exemplary input according to an embodiment of the present invention.
Figure 15:
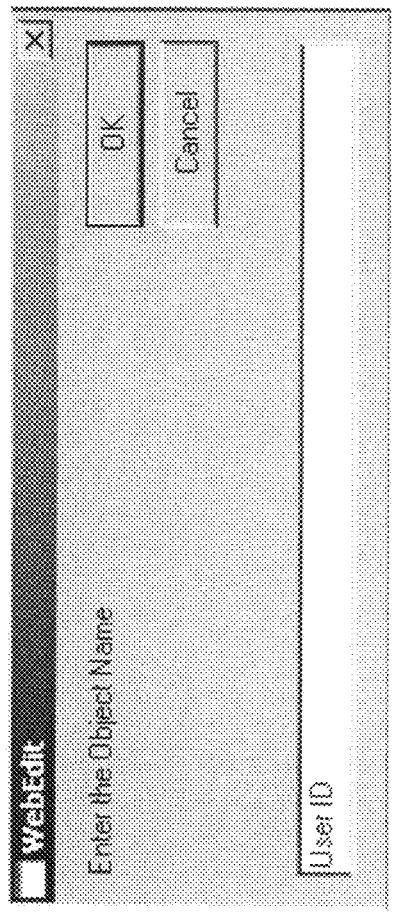

The Learn Objects step travels the recorded path while learning all objects on each page in the path.
- A. Click the 'Learn Object' button
- B. QTP launches and prompts the user for the URL or execution path
- C. The application is opened and the user is presented with an input box, such as shown in FIG. 12
- D. Enter the desired name for the page and click 'OK'
- E. The user is asked whether to run the learning process in 'Attended Mode' (FIG. 13)
- F. As a first pass select 'Yes' and run the process in attended mode
- G. The process begins with a blinking action on an object on the page
- H. The user is prompted with the name value given to that object by a developer (FIG. 14)
- I. The user has the choice of accepting the name or changing it to something else as shown in FIG. 14
- J. Once the user clicks the 'OK' button, the page name, object name, and object description are stored within the TCM database (Note: The object description is what QTP needs in order to communicate with the object during execution.)
- K. The process repeats steps G-J until all the objects for that page have been learned
- L. The saved data for the path is then executed and moves the application to the next page in the path
- M. The process repeats steps C-K for each page within the path (Note: Answer 'No' to 'Attended Mode' runs the object capture process by automatically accepting the object value names given by a developer. The user will not be prompted.)

2.1.5 Edit Objects

The Edit Objects step allows the user to maintain all object information the was previously learned
- A. Click the 'Edit Objects' button
- B. The user is presented with a table view of the objects in the application (Note: This table is part of a relational design so that object descriptions can be associated with test case data.)
- C. The user can modify and update object information using this view when application changes occur

2.2 Test Case

Figure 16:
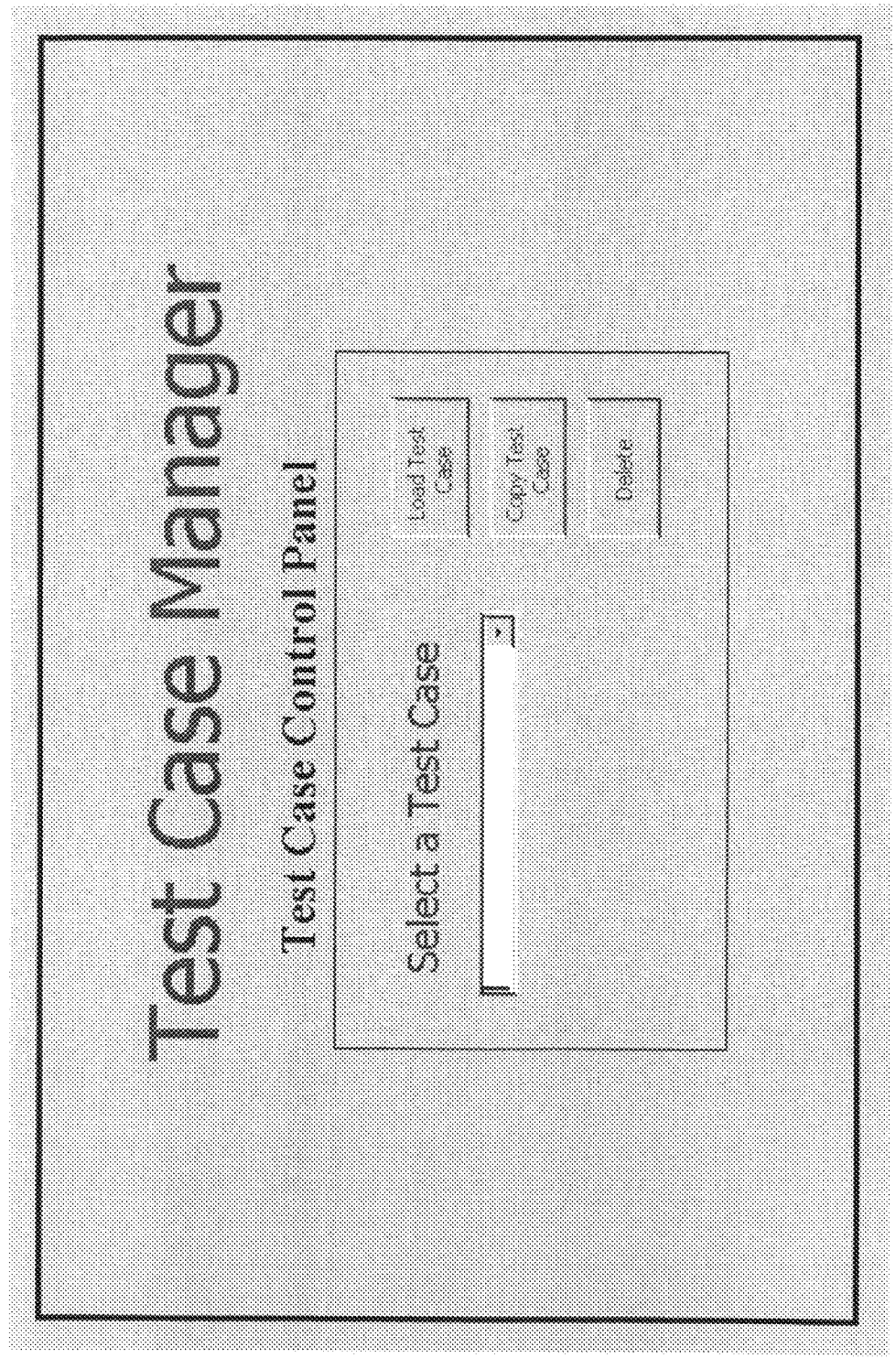
FIG. 16 shows a graphic user interface for access to the Test Case Control Panel according to an embodiment of the present invention.

FIG. 16 shows the Test Case Control Panel. This control panel allows a user to manipulate the load, copy, and delete controls for test case creation and maintenance. Test case data is associated with objects that were learned in the previous section. Ultimately, test cases become instruction sets.

2.2.1 Manual Test Case Creation

Figure 17:
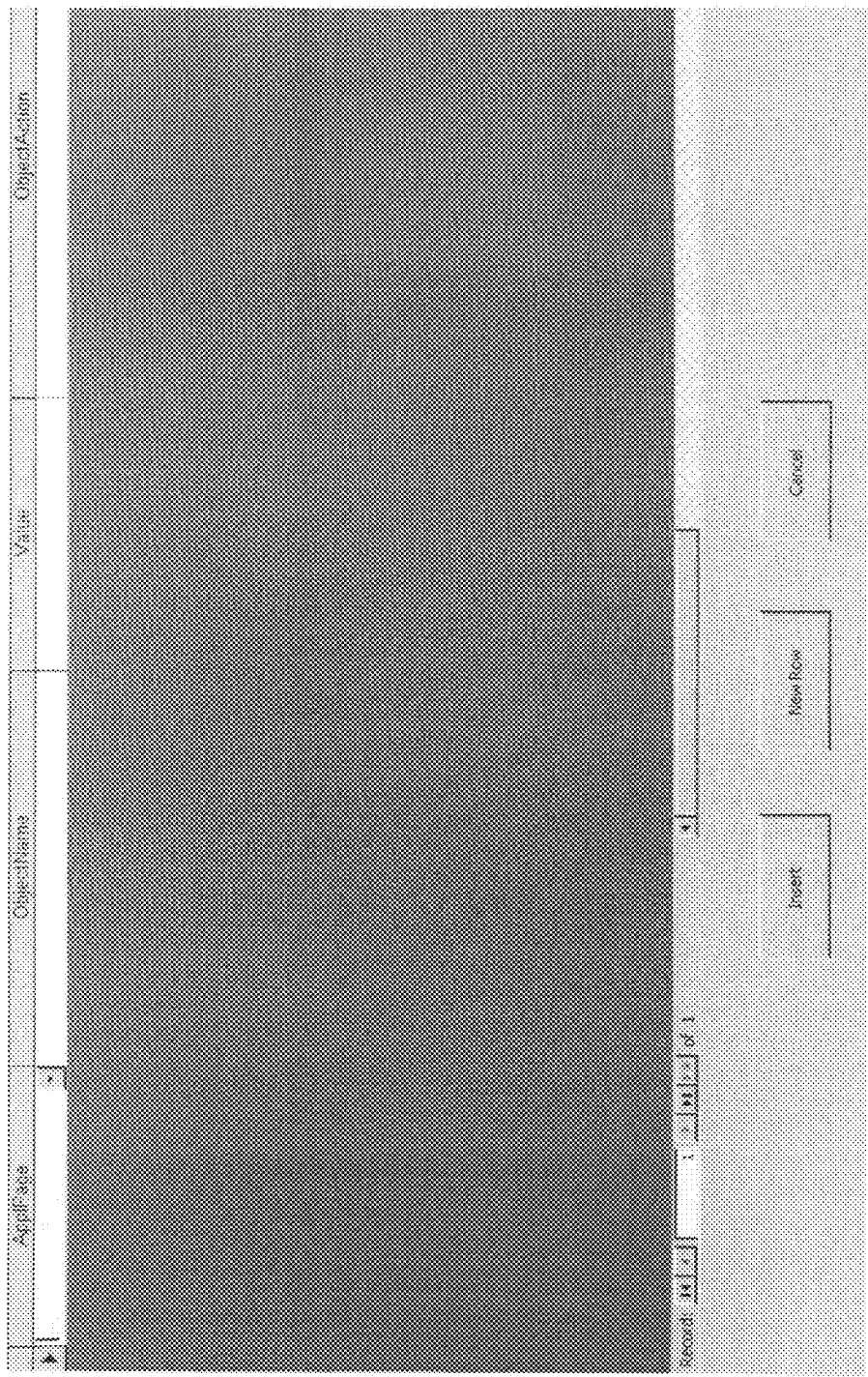
FIG. 17 shows a graphic user interface for creating instruction sets according to an embodiment of the present invention.

The following steps allow a user to create a test case in the form of an instruction set.
- A. Select the 'Default' test case from the dropdown list (this is an empty test case)
- B. Hit the 'Copy Test Case' button
- C. Type a new test case name in the text box
- D. Click the 'Ok' button
- E. Select the new test case from the dropdown list
- F. Click the 'Load Test Case' button
- G. The user is presented with a blank instruction set, such as shown in FIG. 17
- H. Select the first page in the application that the test case will encounter from the 'ApplPage' column
- I. Select the first object that the test case will encounter from the 'ObjectName' column (Note: Only objects associated with the selected page will be available in the 'ObjectName' field for a that row)
- J. Input a value to be used with the selected object
- K. Select an action to be performed on the object (See Appendix for a list of Action descriptions)
- L. Repeat steps A-G to create a series of individual automation instruction steps (See Appendix for a detailed example).
- M. When the instruction set is complete, hit 'Insert' to save the test case

2.2.2 Maintaining Test Cases

The following steps allow a user to maintain a previously saved test case instruction set.
- A. Select the desired test case from the dropdown list
- B. Hit the 'Load Test Case' button
- C. Update any of the information in the instruction set
  1) To add a new row in between instruction set lines, highlight the entire row and hit the 'New Row' button. A new row will be inserted above the highlighted row.
  2) To move multiple rows, use traditional cut & paste methods
- D. Click 'Insert' to save the test case
  1) To exit without saving changes, hit the 'Cancel' button

2.2.3 Copy and Modifying an Existing Test Case

The following steps allow a user to create a new test case from an existing test case
- A. Select a test case from the dropdown list
- B. Hit the 'Copy Test Case' button
- C. Type a new test case name in the text box
- D. Click the 'Ok' button
- E. Select the new test case from the dropdown list
- F. Click the 'Load Test Case' button
- G. The user is presented with a copy of another test case
- H. Make the necessary data changes to the instruction set and hit 'Insert'

2.2.4 Deleting Test Cases

The following steps allow a user remove a test case
- A. Select a test case from the dropdown list
- B. Hit the 'Delete' button
- C. Select 'Yes' to confirm the action or 'No to cancel

2.3 Data Capture

Figure 18:
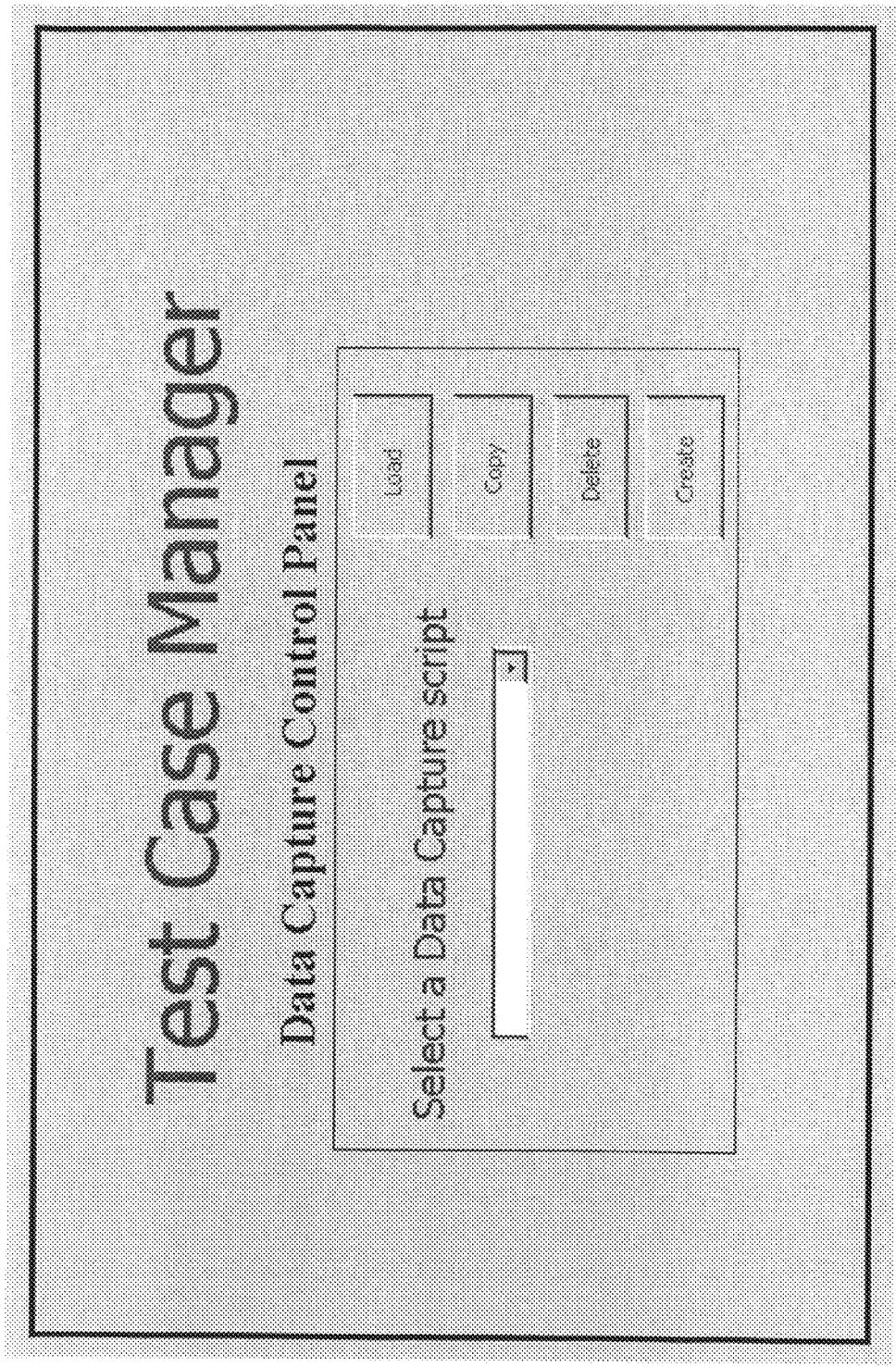
FIG. 18 shows a graphic user interface for access to the Data Capture Control Panel according to an embodiment of the present invention.

The Data Capture Control Panel is shown in FIG. 18. This control panel provides an automated approach for creating test cases in the form of instruction sets. It uses aspects of the AUT or some other data source to accomplish this.

2.3.1 Automated Test Case Creation

The following steps allow a user to create a data capture instruction set from scratch
- A. Click the 'Create' button
- B. The user is presented with a list of application pages on the left side
- C. Move the pages from left to right, and in the order they occur in the application. These will be the pages the data capture script extracts test case information from.

D. Click the 'Get Pages' button
E. The user will be presented with a text box asking for the instruction set name
F. Enter a name and click the 'OK' button
G. The user is presented with two tabs; 'INPUTS' and 'DATA CAPTURE SEQUENCE'
H. Click on the 'DATA CAPTURE SEQUENCE' tab
I. The DATA CAPTURE SEQUENCE tab will display the pages that were selected in STEP C, as well as all the objects that are associated with those pages
J. Remove lines that contain objects that will not be used
K. Add navigation lines that will drive the script to the test case information
   1) To add a new row in between instruction set lines, highlight the entire row and hit the 'New Row' button. A new row will be inserted above the highlighted row.
   2) To move multiple rows, use traditional cut & paste methods
L. Create instruction lines that will insert a new test case in the test case section (see 'z_Scrape' in the Object Action section of the Appendix)
M. Add instruction lines that will help format a new test case in the test case section (see 'z_Insert' in the Object Action section of the Appendix)
N. Identify Inputs (see 'Input' in the Object Action section of the Appendix)
O. Hit the 'Insert' button to save the data capture instruction set
   1) To exit without saving changes, hit the 'Cancel' button 2.3.2 Maintaining Data Capture Instruction Sets
The following steps allow a user to maintain a previously saved data capture instruction set.
   A. Select the desired data capture name from the dropdown list
   B. Hit the 'Load' button
   C. Update any of the information in the instruction set
      1) To add a new row in between instruction set lines, highlight the entire row and hit the 'New Row' button. A new row will be inserted above the highlighted row.
      2) To move multiple rows, use traditional cut & paste methods
   D. Click 'Insert' to save the test case
      1) To exit without saving changes, hit the 'Cancel' button 2.3.3 Copy and Modifying an Existing Data Capture Instruction Set
The following steps allow a user to create a new data capture instruction set from an existing test case
   A. Select a data capture name from the dropdown list
   B. Hit the 'Copy' button
   C. Type a new name in the text box
   D. Click the 'Ok' button
   E. Select the name from the dropdown list
   F. Click the 'Load' button
   G. The user is presented with a copy of another data capture instruction set
   H. Make the necessary data changes to the instruction set and hit 'Insert'

2.3.4 Deleting a Data Capture Instruction Set
The following steps allow a user to remove a data capture instruction set
   A. Select a name from the dropdown list
   B. Hit the 'Delete' button
   C. Select 'Yes' to confirm the action or 'No to cancel

Figure 19:
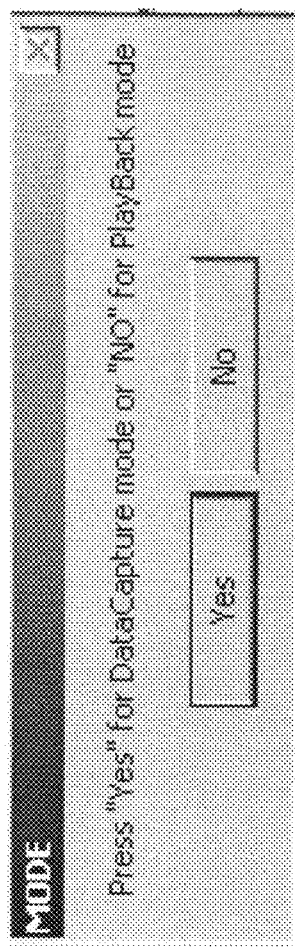
FIG. 19 shows an example of a user interface according to an embodiment of the present invention.
Figure 20:
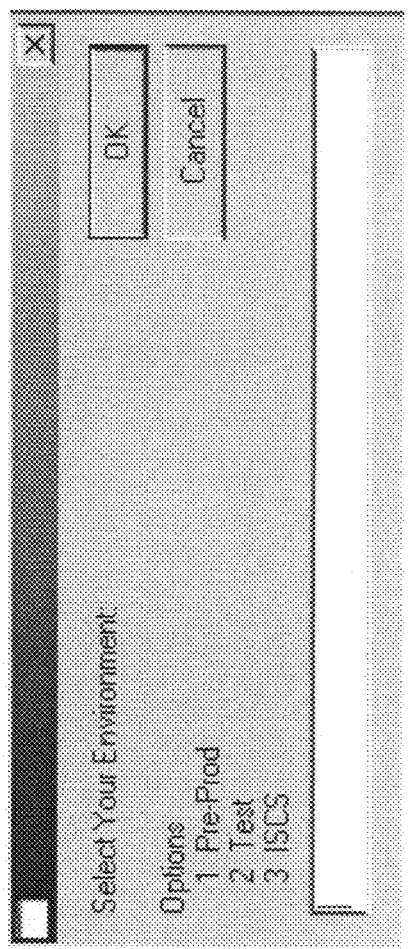
FIGS. 20 and 21 show a user input box according to an embodiment of the present invention.
Figure 21:
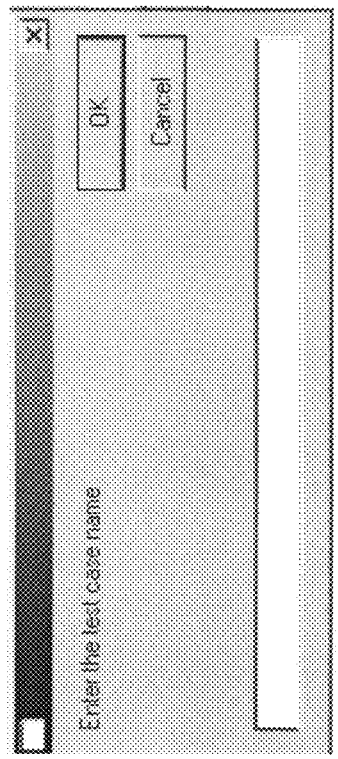

3. SCRIPT LIBRARY 3.1 Test Case Execution
This section discusses how the prewritten QTP library can be executed to run a test case.
3.1.1 Stand Alone
Test cases can be run one at a time.
   A. Launch QTP and open 'Z:\QTP_Version_44\Play Back\PlayBackDriver'
   B. Click the 'Run' Button
   C. The user is presented with a 'Yes' or 'No' option, as shown in FIG. 19
   D. Click the 'No' button to run the script in Play Back mode
   E. The user is asked for environment to run the script (FIG. 20)
   F. Enter the desired number for an environment
   G. The user is asked to enter the name of a test case (same name as any of the test cases in the TCM test case dropdown). See FIG. 21.
   H. Enter the desired test case name
   I. The AUT is invoked and the script begins execution the instruction steps for the specified test case 3.1.2 Batch
Multiple test cases can be run by setting up an execution strategy. The benefit of doing this is to have a quick means for doing application build verifications in an unattended fashion. There are several ways this can be accomplish and integrated with TCM. A good execution strategy will include:
   A test case repository that corresponds to test case names within TCM. This can be accomplished by using test management software such as Quality Center, an excel spreadsheet, or other third party tools.
   A test lab. This will allow the test management software to balance test execution on dedicated testing machines. The TCM test case instruction sets can be accessed from any test machine.
   Test result information used within a framework. The purpose of the TCM instruction sets is to drive the automation engine. Results will then be generated and that information can be organized within a testing framework to quickly identify problem areas.

Figure 22:
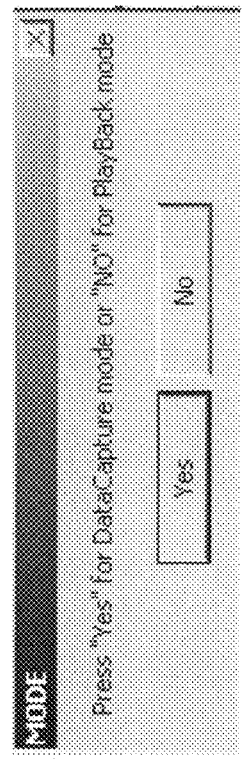
FIG. 22 shows an example of a user interface according to an embodiment of the present invention.
Figure 23:
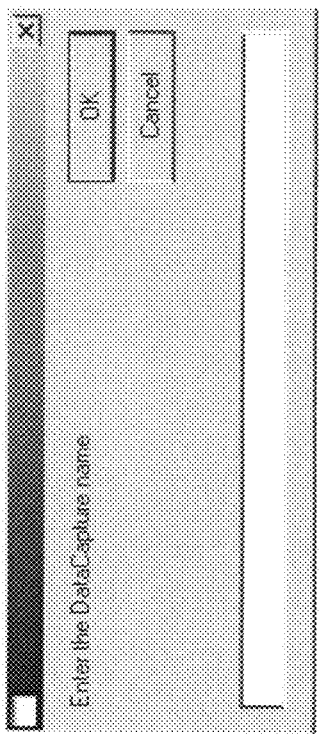
FIGS. 23-25 show a user input box according to an embodiment of the present invention.
Figure 24:
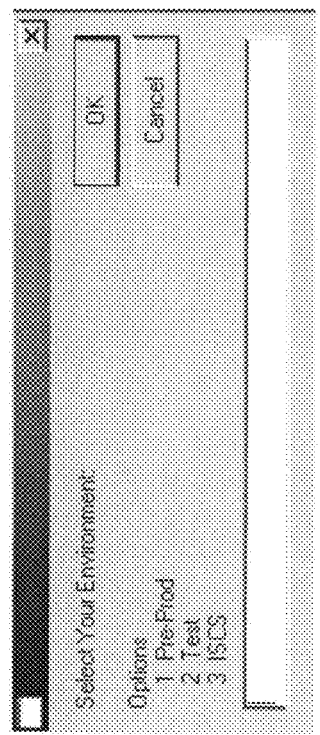
Figure 25:
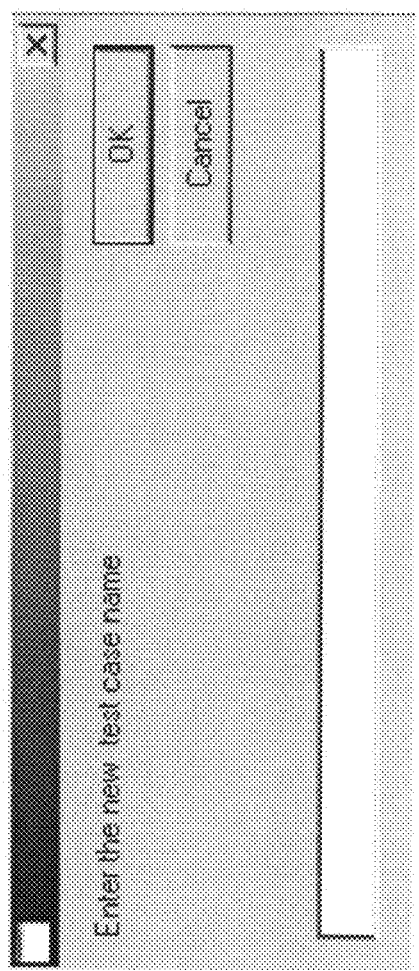

3.2 Data Capture Execution
This section discusses how the prewritten QTP library can be run a data capture instruction set.
3.2.1 Stand Alone
Data Capture instruction sets can be run one at a time.
   A. Launch QTP and open 'Z:\QTP_Version_44\Play Back\PlayBackDriver'
   B. Click the 'Run' Button
   C. The user is presented with a 'Yes' or 'No' option, as shown in FIG. 22
   D. Click the 'Yes' button to run the script in Data Capture mode
   E. The user is asked to enter the name of a Data Capture instruction set (same name as any of the data capture names in the TCM Data Capture dropdown) See FIG. 23.
   F. The user is asked for an environment to run the script (FIG. 24)
   G. Enter the desired number for an environment
   H. The user is asked to provide a name for the test case that the data capture instruction set is going to create (FIG. 25)
   I. Enter the desired name for the new test case
   J. The AUT is invoked and the script begins execution the instruction steps for the specified Data Capture instruction set 3.2.2 Batch
Multiple data capture instruction sets can be run by setting up an execution strategy. The benefit of doing this is to have a quick means of creating several new test cases in an unattended fashion. There are several ways this can be accomplish and integrated with TCM. A good execution strategy will include:

A repository of data capture information that contains a list of new test case names to be created in the TCM test case section. This can be accomplished by using test management software such as Quality Center, an excel spreadsheet, or other third party tools.

A test lab. This will allow the test management software to balance data capture execution on dedicated machines. The TCM data capture instruction sets can be accessed from any test machine.

3.3 Tailoring

This section discusses how an experienced code developer can tailor the existing QTP library to meet specific nuances of any given AUT.

3.3.1 Maintaining Script Code

The following steps allow a user to examine and modify the script library.

A. Open 'Z:\QTP_Version_44\PlayBack\PlayBackDriver'
B. From the QTP menu select Edit/Find
C. Search on the following character sequence: # Main #
D. This section of code shows the main functions that are driven by the TCM instruction sets. They are responsible for calling other functions that directly correspond to the object actions.
E. Set up break points and use the 'step' functionality in QTP to examine the code execution.
  1) Insert a break point by selecting a line of code and hitting F9
  2) Step through code by hitting F11
F. When execution reaches a break point, switch to 'Debug Viewer'
  1) From the QTP menu select View/Debug View
G. In the debug view grid, type the following script variables (These values will allow the user to examine the values that come from the TCM instruction sets and how they interact with the script library.)
  a. ObjectName
  b. ObjectValue
  c. ObjectNameReal
  d. ObjectAction
  e. ObjectID
H. After examining how TCM and the script libraries interact, a user can modify the code and tailor the functions to meet the specific needs (if any) of the AUT.

3.3.2 Adding Script Code

This section discusses how an experienced code developer can tailor the existing QTP library by adding additional functions library.

A. Open the TCM application
B. Close the open screen by hitting the inner 'X'
C. Select 'Tables' under the object panel on the left side
D. Open the 'tbl_ObjectActionList' table
E. Add a new action name to the existing list (be sure to record the new name. You will now be able to use this action with instruction sets. The new entry becomes part of the 'ObjectAction' dropdown list.)
F. Open 'Z:\QTP_Version_44\PlayBack\PlayBackDriver'
G. From the QTP menu select Edit/Find
H. Search on the following character sequence: Function ProcessRecordSet( )
I. Add the name of the recorded name to the major case statement. Be sure to stay within the structured format.

There is now a connection between the script and TCM instruction steps. The next step will be creating the function code that performs the action. The ProcessRecordSet calls the actual function J. Add a new function to the end of the script. Use the same format as any other function.

4. APPENDIX 4.1 Test Case Example

Application: Motorcycle Insurance

The framework automation solution provides an interface between the tester, Quick Test Pro (QTP) and the application under test (AUT). In doing this, the framework user-friendly format reduces the programming skills required to create complex automated test cases and removes the burden of heavy test case maintenance.

The current framework consists of two major components: a Test Case Manager (TCM) and pre-written QTP library scripts. The TCM component stores test case data and navigation commands in a relational database. The navigation commands correspond to functions within the pre-written QTP library. This allows a tester to create test cases in the form of line-by-line instructions in the TCM component. Each instruction set a tester creates is given an individual name most likely representing a test case name. To execute the instruction set, a tester invokes QTP (stand allow or within Quality Center) and provides the instruction set name. Quality Center contains a designated field for a tester to insert the desired instruction set name. The QTP library processes each instruction line by line and performs the specified validation steps on the AUT. FIG. 26 shows an example instruction set for testing.

Test_Case_1

Figure 27:
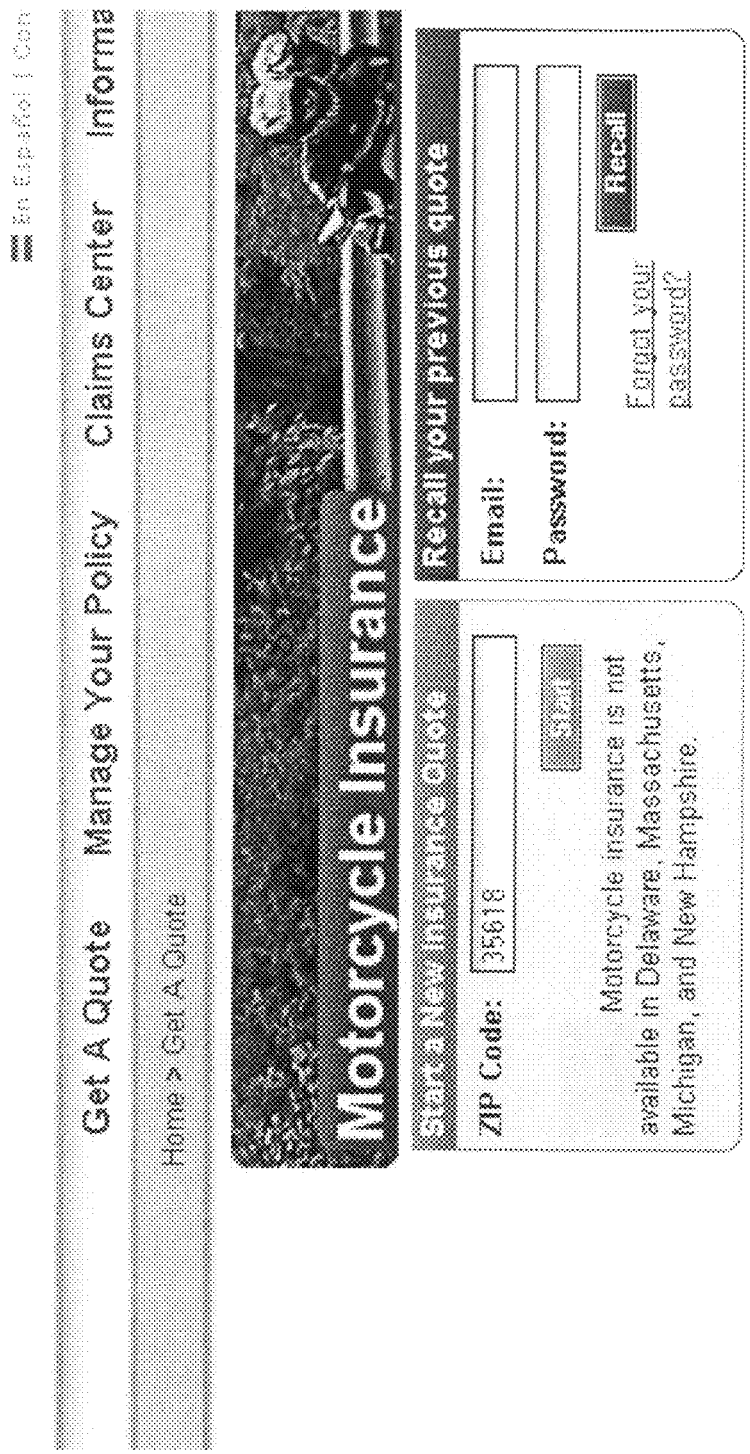
FIG. 27 shows an exemplary application under test according to an embodiment of the present invention.
Figure 28:
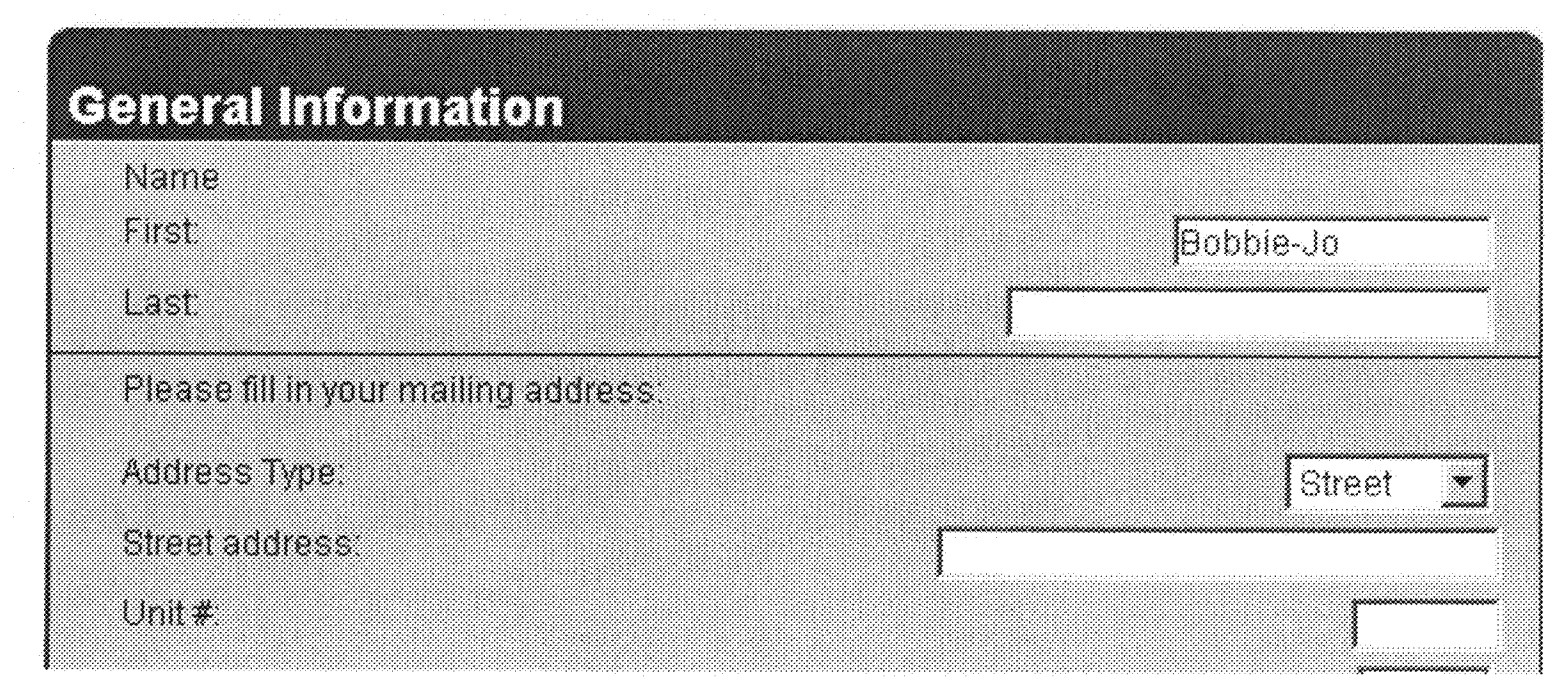
Figure 29:
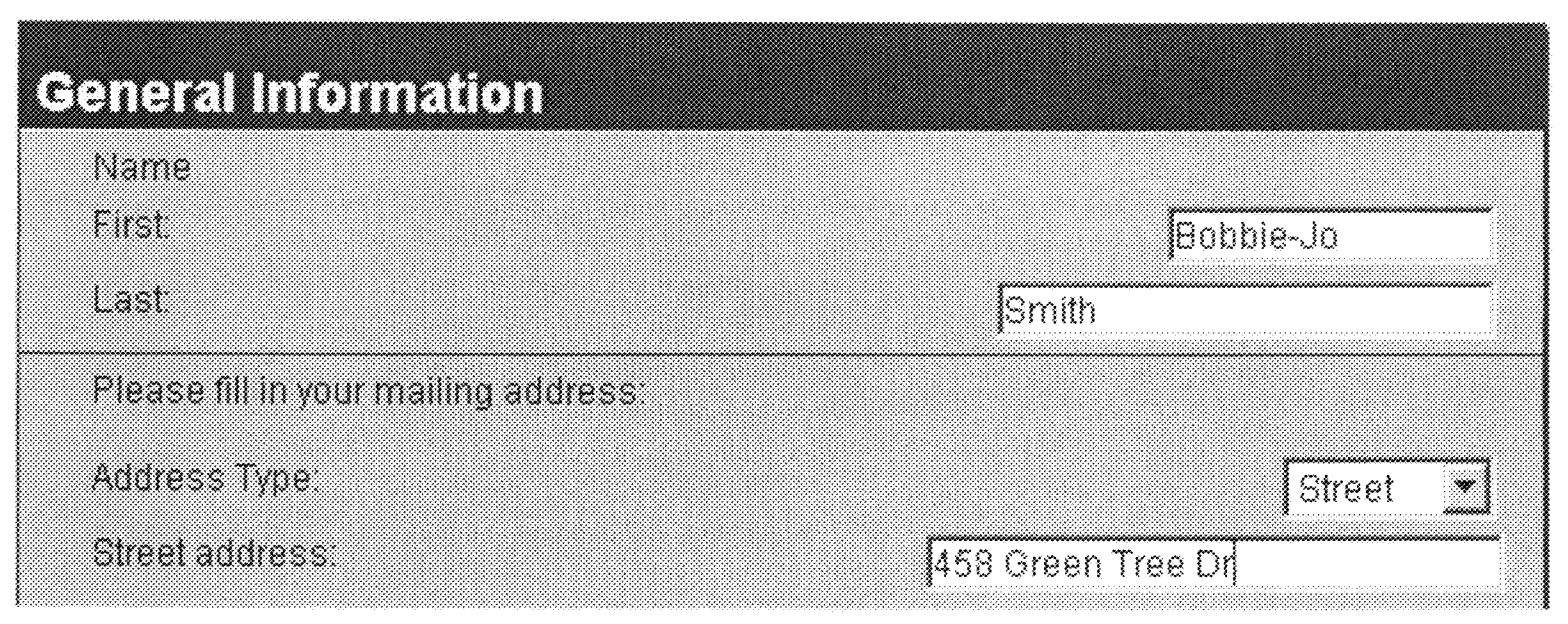

1) QTP is invoked and gets the instruction set name from Quality Center (or user input)
2) The instruction set name is "Test_Case_1".
3) QTP pulls the instruction set from the TCM database and invokes the AUT. See FIG. 27.
4) QTP processes the first line in the instruction set by determining the page (column 1), object (column 2), value (column 3), and the action (column 4).
5) The action "EnterData" tells QTP that it will be inserting the value "35618" into the object "TB_ZIP" on page "Shop For Motorcycle Insurance" of the AUT.
6) QTP drops down to the next line and processes the next instruction the same way. In this case, the "EnterData" command performs a button click, which moves the AUT to the "Customer Information" page.
7) The Instructions will continue to be processed until the table ends. (FIGS. 28 and 29)

4.2 Data Capture Example

A user can automatically create test cases by driving the automation engine to capture data values from the AUT and inserting the values into the test case section. The new test case can be viewed by using the test case control panel drop down selection. The user will find a properly formatted test case (order & data). The data capture instruction set is set up to allow a user to map the object data values from one object to another. Although the following example shows data values being extracted from one system to be used in playback mode for the same system, capturing can be done from one system to be used on another.

This example will show how the table in the test case example can be created using the data capture method. It should be understood that the test case example was created by a user manually filling in the rows and columns and then saving the data. See FIG. 30.

A) The first three lines navigate the data capture mode to the test case information that was created in the AUT. The user can utilizes the fact that the information can be recalled in the AUT buy using the "recall" feature. As a designed system feature of the AUT, insurance customers can recall all information they had previously entered. A TCM user can take advantage of the AUT feature by providing an email/password combination and specify these values as "Inputs" in the object action dropdown. By labeling them Inputs, the user can quickly find and change these values when they want to create a different test case (i.e. a different email/password with different data). The automation engine reads the first lines and is driven to the page where it will capture data.

B) The next two lines in the data capture sequence produce the first two lines in the resulting test case (FIG. 31). Notice the Zip code is captured from the general information page but the value is mapped to the motor cycle page (cannot see the zip box but it is at the bottom of the page). When the test case is run in playback mode, the captured zip code value is used on the motor cycle page. Also, notice how "z_Insert" is being used. In order to create the necessary button click during playback execution, the user can control when this line is inserted during the capture process (see the Object Action Description section for z_Insert format).

C) The last four lines from the data capture sequence produce the last four lines in the resulting test case (FIG. 31). The "z_Scrape" action pulls the data values form the specified object (see the Object Action Description section for z_Scrape format).

4.3 Object Action Descriptions

Compare (FIG. 32)
    Description: Compares the stored value with the run time value of the specified object.
    Input(s): Comparison value in the 'Value' field.
    Output(s): Checkpoint PASS or FAIL.
    Example: From the CarMax website . . . .
This instruction line will compare the "Show me all" value from the value field with the "Show me all" value from the dropdown object "by Make" on the application. It will create a passing checkpoint entry in the results file.

EnterData (FIG. 33)
    Description: Inserts the stored value into an object or performs a button/link click
    Input(s): A valid object value or 'NA' for buttons/links in the value field
    Output(s): None
    Example: From the CarMax website . . . .
These instruction lines will first enter the value "Audi" into the "by Make" dropdown object and then click on the "Search" button.

Exist (FIG. 34)
    a Description: Checks to see that the specified object exists on the application
    Input(s): The value 'True' or 'False' specifying the expected outcome
    Output(s): Checkpoint PASS or FAIL based on the comparison
    Example: From the CarMax website . . . .
This instruction line will check to see whether the 'Search' button exists on the page and compares the true return value with the stored value in the value field. It will create a passing checkpoint entry in the results file.

Figures 35, 36, 37:
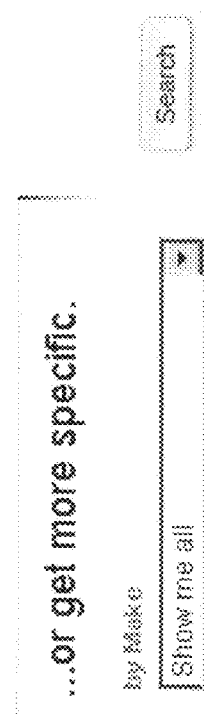

Input
    Description: (Data Capture only) Makes the object visible on the 'Input' tab of the data capture section. This is designated for values that change frequently and drive the data capture operation. During script execution, it will also perform the actions of 'EnterData'
    Input(s): A valid object value
    Output(s): None
    Example: See the Data Capture example in the Appendix section IsEnabled (FIG. 35)
    Description: Checks to see whether the specified object is enabled or disabled
    Input(s): The value 'True' or 'False' specifying the expected outcome
    Output(s): Checkpoint PASS or FAIL based on the comparison
    Example: From the CarMax website . . . .
This instruction line will check to see whether the 'Search' button is enabled on the page, and compares the true return value with the stored value in the value field. It will create a passing checkpoint entry in the results file.

IsVisible (FIG. 35)
    Description: Checks to see whether the specified object is visible or hidden
    Input(s): The value 'True' or 'False' specifying the expected outcome
    Output(s): Checkpoint PASS or FAIL based on the comparison
    Example: From the CarMax website . . . .
This instruction line will check to see whether the 'Search' button is visible on the page and compares the true return value with the stored value in the value field. It will create a passing checkpoint entry in the results file.

NavigateURL (FIG. 36)
    Description: Opens up another web browser during test case execution
    Input(s): A valid URL
    Output(s): None
    Example:
This instruction line will invoke a new browser session by opening the Yahoo page.

Figure 38:
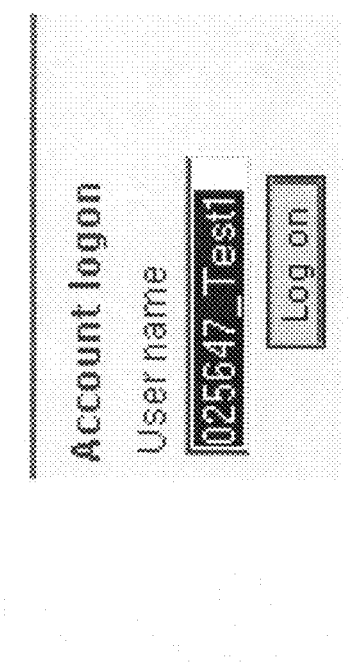

QTPWait (FIG. 37)
    Description: Suspense execution a specified number of seconds
    Input(s): Number of seconds to wait
    Output(s): None
    Example:
This instruction line will wait 30 seconds before continuing script execution RandomValue (FIG. 38)
    Description: Generates a random value and appends it to the value in the value field. The new resulting value is used with the 'EnterData' action.
    Input(s): a value to append to
    Output(s): Randomly Generated value plus append value
    Example: From the Vanguard website . . . .
This instruction line will take the value '_Test1' and append the randomly generated value '0254647' to the front of it. The new value '0254647_Test1' will be inserted into the 'User name' text box.

Figure 39:

StoreValue (FIG. 39)
    Description: Records a value from the selected object and stores the value in a variable specified by the value in the 'Value' field.
    Input(s): Desired name for the variable Output(s): A saved value in the form of a variable that can be recalled later (see UseStoredValue)

Example: From the CarMax website . . . .

This instruction line will capture the value 'Audi' from the dropdown object 'by Make'. The value will be stored in the variable 'SaveTheMakeValue' to be referenced in another instruction line by using the object action 'UseStoredValue'.

SyncObject (FIG. 40)
   Description: Suspends execution until the specified object has rendered
   Input(s): Timeout value in seconds
   Output(s): None if the object renders and FAIL if the timeout value is reached
   Example: From the CarMax website . . . .

This instruction line will suspend subsequent instruction lines from executing until the 'Search' button object has rendered. This action is best used when previous actions cause the page to reload. If 15 seconds expire before the 'Search' button has rendered the test will fail and this will be reflected in the results file.

UseStoredValue (FIG. 41)
   Description: Retrieves a value from a variable that was created during the 'StoreValue' action command
   Input(s): A previously used variable
   Output(s): The value that was stored during runtime
   Example:

This instruction line will perform the 'EnterData' action with the value that was saved in the 'SaveTheMakeValue' variable. The value will be used with the desired object. For example if the <Any Object> was a text box, the value 'Audi' would be inserted.

WebTableClick (FIG. 42)
   Description: Performs a click on a clickable object within a web table
   Input(s): The name of the clickable object (i.e. link or button)
   Output(s): The value that was stored during runtime
   Example: From the CarMax website . . . .

This instruction line clicks the specified object from the 'Value' field within the specified web table.

Width (FIG. 43)
   Description: Checks to see whether the specified object has a width greater than 0
   Input(s): The value 'True' or 'False' specifying the expected outcome
   Output(s): Checkpoint PASS or FAIL based on the comparison
   Example: From the CarMax website . . . .

Figure 45:
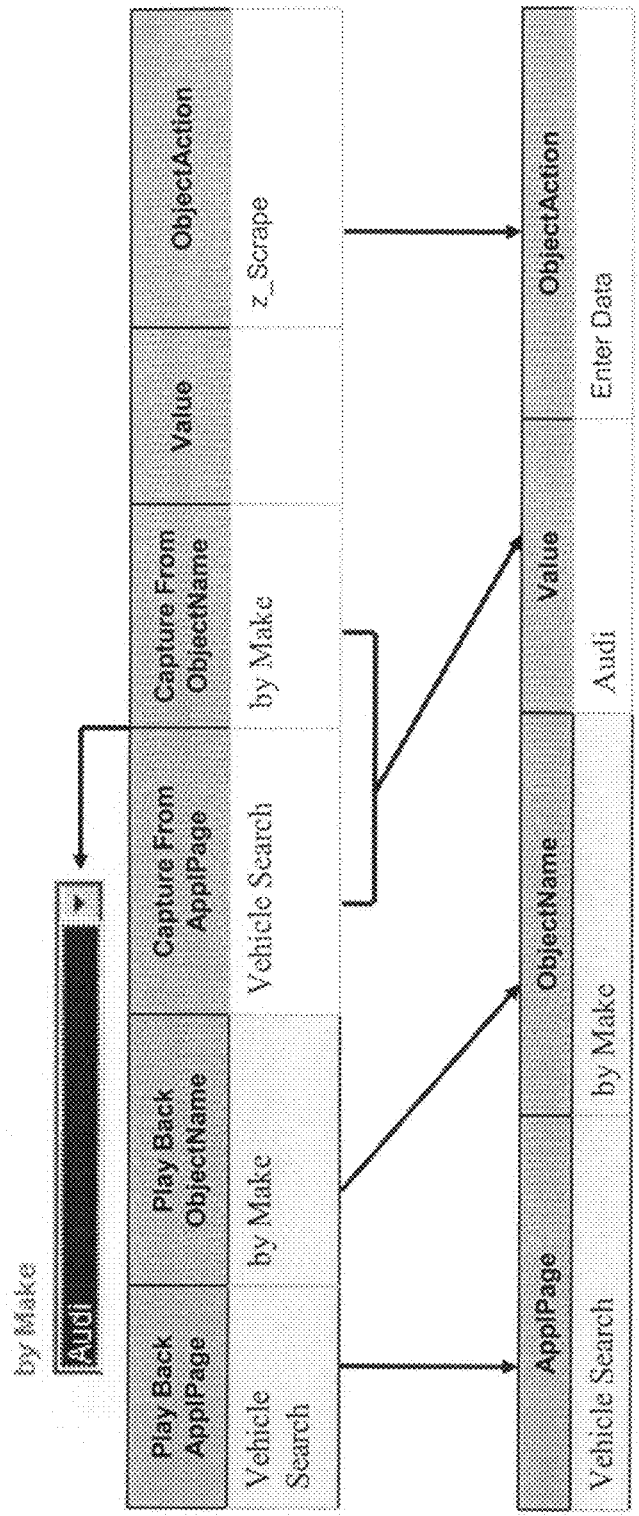

This instruction line checks to see whether the 'Search' button is present on the screen by checking its width value. The comparison will result in a PASS and this will be reflected in the results file.]

z_InsertIntoDatatable (FIG. 44)
   Description: (Data Capture only) During data capture execution, this action will insert a hard coded value into the destination instruction set.
   Input(s): Value in the following format: <Hard Coded Value>***<Action>
   Output(s): None
   Example: Data capture Instruction line and a resulting test case entry The first instruction line will insert the value 1234 into the new test case that the data capture instruction set is creating. The object action is also inserted and the two values are separated by the '***' characters. This allows a user to insert constant values at strategic points during automatic test case creation.

z_Scrape (FIG. 45)
   Description: (Data Capture only) During data capture execution, this action will capture the object, data values specified by the 'Capture From ApplPage' & 'Capture From ObjectName' fields. It will insert the 'Play Back ApplPage' & 'Playback ObjectName' as the 'ApplPage' & 'ObjectName' field values for the new test case instruction set. The 'Value' field is populated with the captured value. 'EnterData' is inserted as the 'ObjectAction'.
   Input(s): None
   Output(s): A new instruction set line
   Example: From the CarMax website . . . .

The arrows indicate the values that create the new test case instruction line. The playback fields populate the 'ApplPage' and 'ObjectName'. The capture from fields are used to capture the value from the AUT and populate the 'Value'. The 'ObjectAction' field is populated with "EnterData'.

The Test Case Manager described herein reduces the programming skills required to create complex automated test cases. Due to the ease of creation, the time invested to create one data capture script could spawn 20 times the amount of test cases. The data table test case steps can be cross-referenced with manual steps as proof of accurate coverage. The logical break up of objects, test case creation, and test case storage facilitates easier maintenance of existing and new applications. Furthermore, the TCM format enables a strategy for modeling automation efforts.

It will be appreciated by persons skilled in the art that numerous variations and/or modifications may be made to the invention as shown in the specific embodiments without departing from the spirit or scope of the invention as broadly described. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein. The present embodiments are, therefore, to be considered in all respects as illustrative and not restrictive.

What is claimed is:

1. A method of testing software applications, comprising the steps of:
   providing a screen display of a software application to be tested;
   defining a path over the screen display to identify objects of the software application for testing;
   storing object information relating to said objects in a database table;
   repeating the path to identify additional objects for testing on the screen display;
   storing the path in a database;
   assigning a value for each object for testing;
   storing the object value in a database table;
   defining a data capture process in the form of step-by-step instructions, wherein a user creates instructions that specify the path to capture data previously entered in the software application;
   relating values of the captured data to stored object value;
   defining a test case process in the form of step-by-step instructions in which user defined object values are related to stored object values;
   storing said step-by-step instructions as a test case script; and
   assigning a unique identifier to said test case script.

2. The method of testing software applications according to claim 1, further comprising:
  storing said step-by-step instructions as a data capture script; and
  assigning a unique identifier to said data capture script.

3. The method of testing software applications according to claim 1, wherein said path is defined automatically.

4. A test case manager for testing software applications, comprising:
  an application module, comprising:
    commands to record, store, and edit a sequence of screen displays of a software application to be tested, said sequence of screen displays determined by a user interacting with the software application to be tested; and
    commands to follow said sequence of screen displays and to learn objects and object properties of the software application for testing; and
  commands to save collected object and object properties in a relational database;
  a test case module, comprising:
    commands to define a test case process in the form of step-by-step instructions by presenting a user with a data table containing information relating to screen displays, objects, values, and action words; and allowing a user to specify particular screen displays, objects, values, and action words corresponding to a user-desired test sequence;
    commands to save user-specified screen displays, objects, values, and action words as portions of one or more playback and validation scripts wherein user defined object values are related to stored object values from the database table;
    commands to store said step-by-step instructions as a test case script; and
    commands to assign a unique identifier to said test case script; and
  a playback driver module, comprising:
    commands to prompt a user to identify desired a playback and validation script;
    commands to retrieve a user-selected playback and validation script from memory; and
    commands to load a selected playback and validation script into an automation tool for execution;
  the test case manager, further comprising a processor to process commands.

5. The test case manager according to claim 4, further comprising: a database that stores test case scripts, data capture scripts, and object values.

6. The test case manager according to claim 5, wherein said database is a distributed database.

7. A test case manager according to claim 4, further comprising:
  a data capture module, comprising:
    commands to capture screen sequence and object value data previously entered into the software application for testing during a prior user-interaction with said software application for testing;
    commands to map previously entered object values to objects stored by the application module and;
    commands to present a user with a data table containing information relating to screen displays, objects, values, and action words from said prior use-interaction with said software application for testing.

8. A test case manager software program for providing a user friendly interface for the assembly of test case scripts for a plurality of different software testing applications, comprising computer readable instructions, stored on a non-transitory computer readable medium, said instructions Configured for:
  receiving input from a user identifying a software application for testing and a software testing automation tool for testing the software application;
  communicating with a plurality of different software testing automation tools to selectively command one of said plurality of different software testing automation tools to open, and to activate a recording function to record a user's interaction with the software application to be tested;
  extracting from one of said plurality of different software testing automation tools information representing a sequence of screens encountered by said user during said interaction;
  causing the automation tool to run a sequence of display screens corresponding to the sequence encountered by said user during said interaction, or a revised sequence thereof, to learn unique properties of objects within the screens of the sequence and to store said screens, said objects, and said unique object properties in a database table;
  displaying to a user a representation of said screens, said objects and said unique object properties in the software application;
  permitting a user to make selections of screens, objects and object properties from among said displayed representations of screens, objects and object properties, said selections corresponding to a user-desired sequence for the testing of said software application;
  providing to said automation tool lines of code that permit said automation tool to automatically generate a test case script, in a language appropriate for said automation tool, that corresponds to the user-desired sequence for the testing of said software application causing the automation tool to run the test case script;
  said instructions further configured for:
  defining a test case process in the form of step-by-step instructions in which user defined object values are related to stored object value;
  storing said step-by-step instructions as a test case script; and
  assigning a unique identifier to said test case script.

9. A test case manager for testing software applications according to claim 8, further comprising computer readable instructions stored on a non-transitory computer readable medium, said instructions further configured for:
  capturing data previously entered in the software application;
  wherein the test case script is built using the captured data.

* * * * *